(12) United States Patent
Faith et al.

(10) Patent No.: US 8,924,440 B2
(45) Date of Patent: *Dec. 30, 2014

(54) EXTENT-BASED STORAGE ARCHITECTURE

(71) Applicant: NetApp, Inc., Sunnyvale, CA (US)

(72) Inventors: Rickard E. Faith, Hillsborough, NC (US); Subramaniam Perivagaram, San Jose, CA (US); Sandeep Yadav, Santa Clara, CA (US); Ashish Prakash, Morrisville, NC (US); Blake Lewis, Los Altos, CA (US); Jeffrey S. Kimmel, Chapel Hill, NC (US); Stephen Daniel, Durham, NC (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/968,117

(22) Filed: Aug. 15, 2013

(65) Prior Publication Data

US 2014/0172928 A1      Jun. 19, 2014

Related U.S. Application Data

(63) Continuation of application No. 13/098,310, filed on Apr. 29, 2011, now Pat. No. 8,539,008.

(51) Int. Cl.
    *G06F 17/30* (2006.01)
    *G06F 13/00* (2006.01)
    *G06F 3/06* (2006.01)

(52) U.S. Cl.
    CPC .............. *G06F 3/064* (2013.01); *G06F 3/061* (2013.01); *G06F 3/0644* (2013.01); *G06F 17/30091* (2013.01); *G06F 17/30203* (2013.01); *G06F 3/0689* (2013.01)

USPC ........................................... 707/822; 711/173

(58) Field of Classification Search
    CPC .. G06F 3/064; G06F 3/0644; G06F 17/30091
    USPC .................................. 707/812, 822; 711/173
    See application file for complete search history.

(56) References Cited

U.S. PATENT DOCUMENTS

| 7,321,962 | B1 * | 1/2008 | Fair et al. ....................... 711/202 |
| 7,562,203 | B2 * | 7/2009 | Scott et al. .................... 711/165 |
| 7,664,791 | B1 * | 2/2010 | Hamilton ....................... 707/804 |
| 7,702,870 | B2 * | 4/2010 | English et al. ................ 711/165 |

(Continued)

FOREIGN PATENT DOCUMENTS

WO         2010040078          4/2010

*Primary Examiner* — Jorge A Casanova
(74) *Attorney, Agent, or Firm* — DeLizio Gilliam, PLLC

(57) ABSTRACT

An extent-based storage architecture is implemented by a storage server receiving a read request for an extent from a client, wherein the extent includes a group of contiguous blocks and the read request includes a file block number. The storage server retrieves an extent identifier from a first sorted data structure, wherein the storage server uses the received file block number to traverse the first sorted data structure to the extent identifier. The storage server retrieves a reference to the extent from a second sorted data structure, wherein the storage server uses the retrieved extent identifier to traverse the second sorted data structure to the reference, and wherein the second sorted data structure is global across a plurality of volumes. The storage server retrieves the extent from a storage device using the reference and returns the extent to the client.

20 Claims, 14 Drawing Sheets

(56) References Cited

U.S. PATENT DOCUMENTS

| | | |
|---|---|---|
| 7,730,277 B1 * | 6/2010 | Prakash et al. ............... 711/170 |
| 7,870,172 B1 | 1/2011 | Sarma |
| 8,037,349 B2 | 10/2011 | Mandagere et al. |
| 2005/0108296 A1 | 5/2005 | Nakamura et al. |
| 2007/0130431 A1 | 6/2007 | Sano |
| 2009/0265399 A1 | 10/2009 | Cannon et al. |
| 2010/0094817 A1 | 4/2010 | Ben-shaul et al. |
| 2010/0131480 A1 | 5/2010 | Schneider |
| 2010/0274772 A1 | 10/2010 | Samuels |
| 2011/0016095 A1 | 1/2011 | Anglin et al. |
| 2011/0055621 A1 | 3/2011 | Mandagere et al. |
| 2012/0330903 A1 | 12/2012 | Periyagaram et al. |

* cited by examiner

| FBN 705 | Extent ID 710 | Length 715 |

Volume layer indirect entry 700

Fig. 7

| Extent ID 805 | Pointer 810 | Offset 815 | Length 820 |

Extent map entry 800

Fig. 8

EXTENT-BASED STORAGE ARCHITECTURE

RELATED APPLICATION

This present application is a continuation of co-pending patent application Ser. No. 13/098,110, filed Apr. 29, 2011, which is assigned to the same assignee as the present application.

FIELD OF THE INVENTION

At least one embodiment of the present invention pertains to data storage systems, and more particularly, to performing read and write operations according to an extent-based storage architecture.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2011, NetApp, Inc., All Rights Reserved.

BACKGROUND

Various forms of network-based storage systems exist today. These forms include network attached storage (NAS), storage area networks (SAN's), and others. Network-based storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems (clients). The data is stored and retrieved as storage objects, such as blocks and/or files. A block is a sequence of bytes or bits of data having a predetermined length. A file is a collection of related bytes or bits having an arbitrary length. In the context of NAS, a storage server operates on behalf of one or more clients to store and manage file-level access to data. The files may be stored in a storage system that includes one or more arrays of mass storage devices, such as magnetic or optical disks or tapes, by using a data storage scheme such as Redundant Array of Inexpensive Disks (RAID). In a SAN context, a storage server provides clients with block-level access to stored data, rather than file-level access. Some storage servers are capable of providing clients with both file-level access and block-level access, such as certain storage servers made by NetApp, Inc. (NetApp®) of Sunnyvale, Calif.

FIG. 1 is a prior art illustrative embodiment of a Write Anywhere File Layout (WAFL) file system. Referring to FIG. 1, WAFL aggregate 100 is an instance of the WAFL file system. WAFL aggregate 100 includes one or more flexible volumes 110, one or more volume containers 120, and physical storage 130.

WAFL aggregate 100 is a physical storage container that can store data in the WAFL file system. Flexible volume 110 is a logical volume that allows the virtualization of the allocation of volumes on physical storage 130. Thereby multiple, independently managed flexible volumes 110 can share the same physical storage (e.g., physical storage 130). The virtualization requires mapping between virtual volume block numbers (VVBNs) used by flexible volume 110 and physical volume block numbers (PVBNs) used by WAFL aggregate 100 to access data stored in physical storage 130. A PVBN, as used herein, refers disk blocks that have been abstracted into a single linear sequence in the aggregate. Each volume container 120 corresponds to a flexible volume 110. Volume container 120 contains all the data blocks for a corresponding flexible volume 110.

As used herein, a block offset or an offset refers to a distance in blocks from the beginning of a storage object such as a volume, file, extent, etc. Block addresses used within flexible volume 110 refer to block offsets within volume container 120. Since volume container 120 contains every block within flexible volume 110, there are two ways to refer to the location of a particular block. The PVBN specifies the location of a block within WAFL aggregate 100. The VVBN specifies the offset of the block within the container file. When a block in a file is requested, flexible volume 110 translates the file offset into a VVBN. The VVBN is passed from flexible volume 110 to volume container 120. Volume container 120 translates the VVBN to a PVBN. The PVBN is then used to access the requested block in physical storage 130. Additionally, when a PVBN is initially written, the block pointer for the PVBN in flexible volume 110 is written to include (e.g., in a cache) the PVBN for the VVBN. Thereby, when the requested block is required, the flexible volume 110 can use the stored PVBN to access physical storage 130.

Current implementations of WAFL define a file as a tree of indirect blocks. Each indirect block in the tree has a fixed span: a fixed number of entries, each pointing to another block in the tree. Extents are represented using an entry for each block within the extent. An extent, as used herein, refers a contiguous group of one or more blocks. As a result, the amount of indirect block metadata is linear with respect to the size of the file. Additionally, disk gardening techniques, such as segment cleaning, file reallocation, etc., are complicated by caching PVBN pointers in VVBN blocks.

Storage systems often use a predetermined block size for all internal operations. For example, WAFL uses 4 KB (e.g., 4096 bytes) blocks for both VVBN and PVBN, as do client-side file systems for file block numbers (FBN). Block boundaries are expected to occur every 4 KB from an initial offset (e.g., FBN 0). Since file systems usually offset individual files based on these block boundaries, application writers take advantage of a file system's block size and alignment to increase the performance of their input/output ("I/O") operations for example, always performing I/O operations that are a multiple of 4 KB, and always aligning these operations to the beginning of a file. Other file systems or applications, such as a virtual machine, may use a block boundary of a different size (e.g., a virtual machine environment in which an initial master boot record block of 512 bytes is followed by the expected 4 KB blocks), resulting in misalignment between FBN's and PVBN's. Additionally, multiple virtual machines may share a single volume container 120 and each virtual machine may misaligned by a different amount.

SUMMARY

An embodiment of an extent-based storage architecture is implemented by a storage server receiving a read request for an extent from a client, wherein the extent includes a group of contiguous blocks and the read request includes a file block number. The storage server retrieves an extent identifier from a first sorted data structure in the volume layer, wherein the storage server uses the received file block number to traverse the first sorted data structure to the extent identifier. The storage server retrieves a reference to the extent from a second sorted data structure in the aggregate layer, wherein the storage server uses the retrieved extent identifier to traverse the second sorted data structure to the reference. The storage server retrieves the extent from a storage device using the reference and returns the extent to the client.

Another embodiment of an extent-based storage architecture is implemented by a storage server receiving a write request from a client for an extent including a group of contiguous blocks and a file block number. The storage server writes an entry in a first sorted data structure in the aggregate layer, the entry including an extent identifier and a reference to the extent in the storage device, wherein the extent identifier is used to determine a location of the entry, in the first sorted data structure. The storage server further writes an entry in a second sorted data structure in the volume layer, the entry including the file block number and the extent identifier, wherein the file block number is used to determine a location of the entry in the second sorted data structure.

BRIEF DESCRIPTION OF THE DRAWINGS

One or more embodiments of the present invention are illustrated by way of example and not limitation in the figures of the accompanying drawings, in which like references indicate similar elements and in which:

FIG. 7 illustrates an exemplary volume layer indirect entry for a leaf node of the extent-based data structure of FIG. 6 when used to it an indirect volume;

FIG. 8 illustrates an exemplary extent map entry for a leaf node of the extent-based data structure of FIG. 6 when used to implement an extent-to-physical block map;

DETAILED DESCRIPTION

Figure 1:
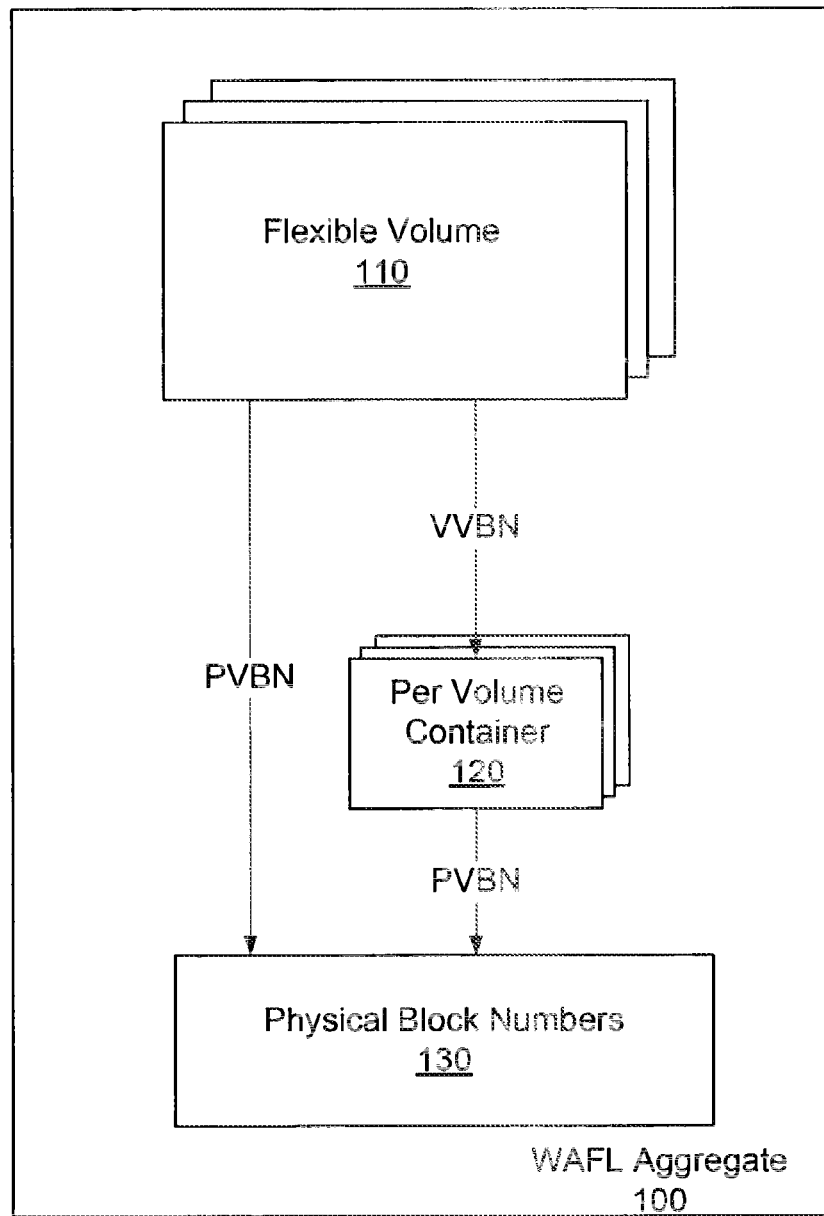
FIG. 1 illustrates a prior art exemplary implementation of an embodiment of a Write Anywhere File Layout.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims. References in this specification to "an embodiment," "one embodiment," or the like, mean that the particular feature, structure or characteristic being described is included in at least one embodiment of the present invention. However, occurrences of such phrases in this specification do not necessarily all refer to the same embodiment.

As set forth in further detail below, embodiments of the extent-based architecture include a storage server receiving an I/O request including an FBN for an extent. The storage server uses the received FBN as a key to traverse a sorted data structure in the volume layer to an extent identifier. The storage server uses the extent identifier as a key to traverse a second sorted data structure in the aggregate layer to a reference or pointer. The second sorted data structure maps extent identifiers, either directly or indirectly, to PVBN's. For one embodiment, the reference or pointer in the second sorted data structure identifies or refers directly to a PVBN for the extent. Alternatively, the reference or pointer identities another extent identifier that, in turn, refers directly to a PVBN for the extent. Given that entries in the volume layer are per extent, rather than per data block as in previous implementations of WAFL, the implementation of an extent-based architecture results in a significant decease in volume layer metadata and, in turn, performance improvement due to the decrease in metadata involved in common operations. By separating the data stored in the volume layer from the data stored in the aggregate layer, the extent-based architecture provides the storage server with the ability to write and rearrange data blocks on disk without changing the corresponding extent identifier(s). This implies that the sorted data structure in the volume layer does not need to be updated for some manipulation of data blocks on disk. Block/extent compression, block/extent decompression, block/extent sharing, disk gardening, etc. can be performed without communicating with the volume layer. Additionally, because the sorted data structure in the volume layer is traversed using an FBN, which is mapped to an extent identifier, the extent-based architecture can avoid the misalignment problem of previous implementations of WAFL when the initial offset of data blocks occurs at a different granularity than the data block size (e.g., a 512 byte offset for 4 KB blocks).

For one embodiment, a PVBN may be referenced directly by only one extent identifier and an extent identifier may not reference a second extent identifier if that second extent identifier references a third extent identifier. This embodiment prevents the level of indirect references in extent map entries from becoming arbitrarily deep and taking an arbitrary amount of time (as measured in terms of disk I/O operations, assuming that each extent entry is likely to be stored within a different disk block and require a separate I/O operation).

For one embodiment, an extent identifier may include multiple references or pointers. Partial ranges of data blocks within an extent can be overwritten, deduplicated, compressed, etc. Additionally, the indirection provided by the extent-based architecture allows partial ranges of data blocks within an extent to be overwritten without first reading the extent. In contrast, an extent overwrite operation in previous implementations of file systems included reading the data blocks of data from a storage device into a buffer, overwriting a portion of the data blocks within the buffer, and writing the updated blocks of data back to the storage device.

For one embodiment, the extent-to-PVBN mapping in the aggregate layer is global across volumes. As used herein, reference to the extent-to-PVBN mapping being global across volumes refers to a storage server 210 being able to share (or end the sharing of) data blocks within extents (e.g., via the extent to physical block map 520) across volume boundaries as defined in the volume layer 515. This is very difficult in previous implementations of file systems because file systems typically do not support a layer of indirection that spans a space larger than a single volume.

Figure 2A:
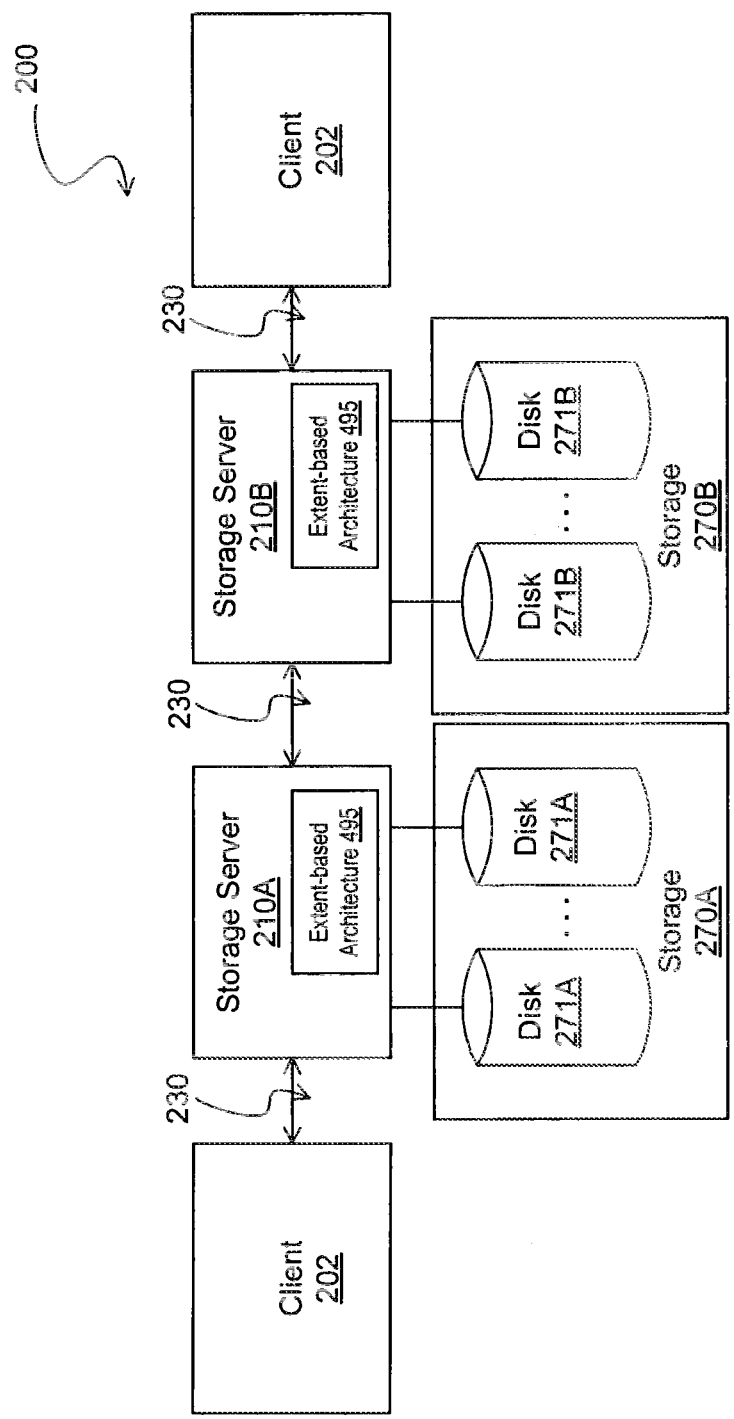
FIG. 2A illustrates a network storage system in which an extent-based storage architecture may be implemented.

FIG. 2A shows a network storage system 200 in which an extent-based storage architecture 49 can be implemented. Storage servers 210 (storage servers 210A, 210B) each manage multiple storage units 270 (storage 270A, 270B) that include mass storage devices. These storage servers 210 provide data storage services to one or more clients 202 through a network 230. Network 230 may be, for example, a local area network (LAN), wide area network (WAN), metropolitan area network (MAN), global area network (GAN) such as the Internet, a Fibre Channel fabric, or any combination of such interconnects. Each of clients 202 may be, for example, a conventional personal computer (PC), server-class computer, workstation, handheld computing or communication device, a virtual machine, or other special or general purpose computer.

Storage of data in storage units 270 is managed by storage servers 210 which receive and respond to various I/O requests from clients 202, directed to data stored in or to be stored in storage units 270. Data is accessed (e.g., in response to the I/O requests) in units of blocks, which in the present embodiment are 4 KB in size, although other block sizes (e.g., 51 bytes, 2 KB, 8 KB, etc.) may also be used. For one embodiment, 4 KB as used herein refers to 4,096 bytes. For an alternate embodiment, 4 KB refers to 4,000 bytes. Storage units 270 constitute mass storage devices which can include, for example, flash memory, magnetic or optical disks, or tape drives, illustrated as disks 271 (271A, 271B). The storage devices 271 can further be organized into arrays (not illustrated) implementing a Redundant Array of Inexpensive Disks/Devices (RAID) scheme, whereby storage servers 210 access storage units 270 using one or more RAID protocols. RAID is a data storage scheme that divides and replicates data among multiple hard disk drive—e.g., in stripes of data. Data striping is the technique of segmenting logically sequential data, such as a single file, so that segments can be assigned to multiple physical devices/hard drives. Redundant (parity) data is stored to allow problems to be detected and possibly fixed. For example, if one were to configure a hardware-based RAID-5 volume using three 250 GB hard drives (two drives for data, and one for parity), the operating system would be presented with a single 500 GB volume and the exemplary single file may be stored across the two data drives. Although illustrated as separate components, for one embodiment, a storage server 210 and storage unit 270 may be a part of/housed within a single device.

Storage servers 210 can provide file-level service such as used in a network-attached storage (NAS) environment, block-level service such as used in a storage area network (SAN) environment, a service which is capable of providing both file-level and block-level service, or any other service capable of providing other data access services. Although storage servers 210 are each illustrated as single units in FIG. 2A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module) and may include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 2B and embodiments of a D-module and a N-module are described further below with respect to FIG. 4.

In yet other embodiments, storage servers 210 are referred to as network storage subsystems. A network storage subsystem provides networked storage services for a specific application or purpose. Examples of such applications include database applications, web applications, Enterprise Resource Planning (ERP) applications, etc., e.g., implemented in a client. Examples of such purposes include file archiving, backup, mirroring, etc., provided, for example, on an archive, a backup, or a secondary storage server connected to a primary storage server. A network storage subsystem can also be implemented with a collection of networked resources provided across multiple storage servers and/or storage units.

In the embodiment of FIG. 2A, one of the age servers (e.g., storage server 210A) functions as a primary provider of data storage services to client 202. Data storage requests from client 202 are serviced using disks 271A organized as one or more storage objects. A secondary storage server (e.g., storage server 210B) takes a standby role in a mirror relationship with the primary storage server, replicating storage objects from the primary storage server to storage objects organized on disks of the secondary storage server (e.g., disks 270B). In operation, the secondary storage server does not service requests from client 202 until data in the primary storage object becomes inaccessible such as in a disaster with the primary storage server, such event considered a failure at the primary storage server. Upon a failure at the primary storage server, requests from client 202 intended for the primary storage object are serviced using replicated data (i.e. the secondary storage object) at the secondary storage server.

It will be appreciated that in other embodiments, network storage system 200 may include more than two storage servers. In these cases, protection relationships may be operative between various storage servers in system such that one or more primary storage objects from storage server 210A may be replicated to a storage server other than storage server 210B (not shown in this figure). Secondary storage objects nay further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 210 should be taken as illustrative only.

Figure 2B:
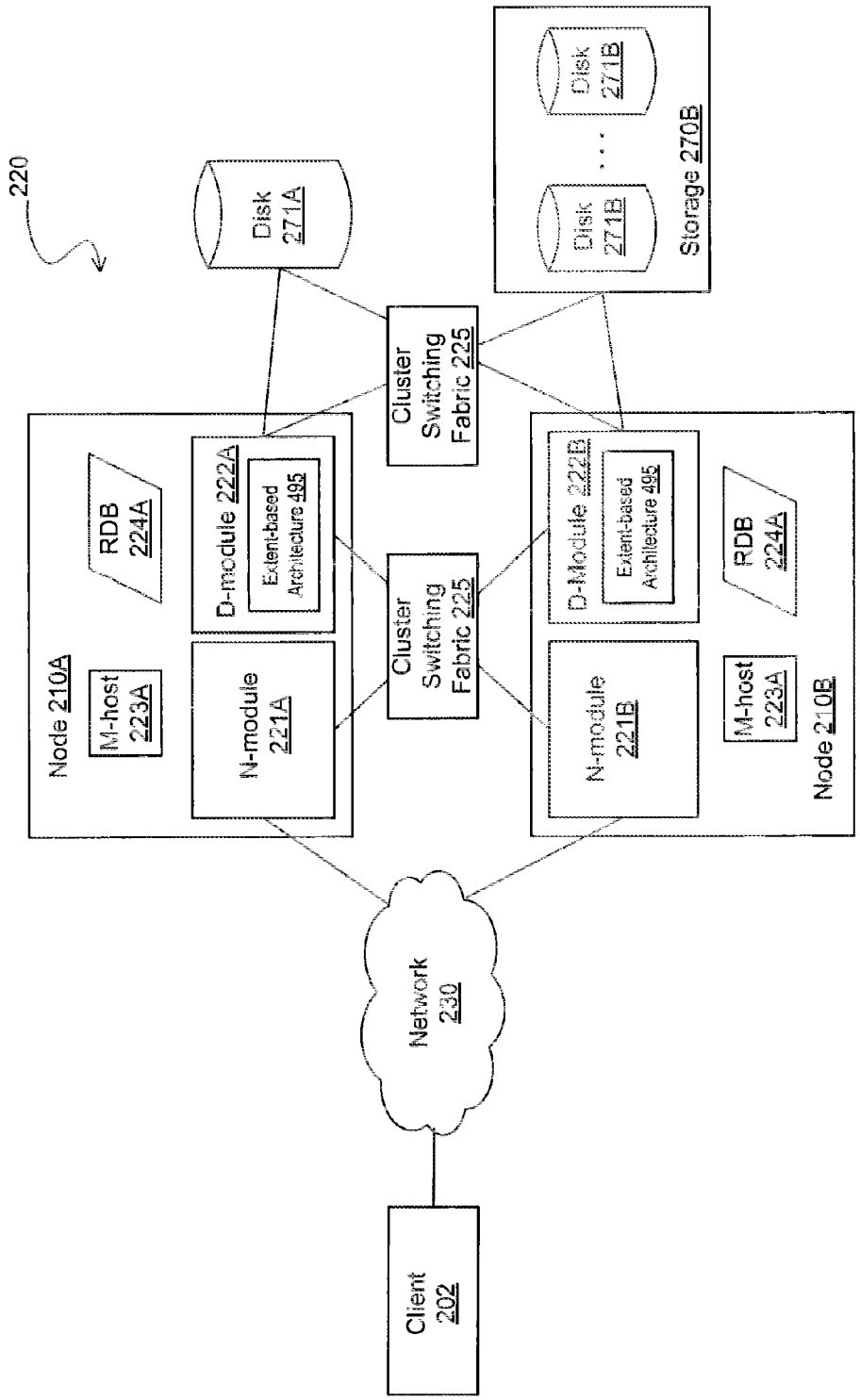
FIG. 2B illustrates a distributed or clustered architecture for a network storage system in which an extent-based storage architecture may be implemented in an alternative embodiment.

FIG. 2B illustrates a block diagram of a distributed or clustered network storage system 220 which may implement rapid cloning in one embodiment. System 220 may include storage servers implemented as nodes 210 (nodes 210A, 210B) which are each configured to provide access to storage devices 271. In FIG. 2B, nodes 210 are interconnected by a cluster switching fabric 225, which may be embodied as an Ethernet switch.

Nodes 210 may be operative as multiple functional components that cooperate to provide a distributed architecture of system 220. To that end, each node 210 may be organized as a network element or module (N-module 221A, 221B), a disk element or module (D-module 222A, 222B), and a management element or module (M-host 223A, 223B). In one embodiment, each module includes a processor and memory for carrying out respective module operations. For example, N-module 221 may include functionality that enables node 210 to connect to client 202 via network 230 and may include protocol components such as a media access layer, Internet Protocol (IP) layer, Transport Control Protocol (TCP) layer, User Datagram Protocol (UDP) layer, and other protocols known in the art.

In contrast, D-module 222 may connect to one or more storage devices 271 via cluster switching fabric 225 and may be operative to service access requests on devices 270. In one embodiment, the D-module 222 implements an extent-based storage architecture 495, as will be described in greater detail below. In one embodiment, the D-module 222 includes storage access components such as a storage abstraction layer supporting multi-protocol data access (e.g., Common Internet File System protocol, the Network File System protocol, and the Hypertext Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 2B, a storage abstraction layer (e.g., file system) of the D-module divides the physical storage of devices 270 into storage objects. Requests received by node 210 (e.g., via N-module 221) may thus include storage object identifiers to indicate a storage object on which to carry out the request.

Also operative in node 210 is M-host 223 which provides cluster services for node 210 by performing operations in support of a distributed storage system image, for instance, across system 220. M-host 223 provides cluster services by managing a data structure such as a RDB 224 (RDB 224A, RDB 224B) which contains information used by N-module 221 to determine which D-module 222 "owns" (services) each storage object. The various instances of RDB 224 across respective nodes 210 may be updated regularly by M-host 223 using conventional protocols operative between each of the NI-hosts (e.g., across network 230) to bring them into synchronization with each other. A client request received by N-module 221 may then be routed to the appropriate D-module 222 for servicing to provide a distributed storage system image.

It should be noted that while FIG. 2B shows an equal number of N- and D-modules constituting a node in the illustrative system, there may be different number of N- and D-modules constituting a node in accordance with various embodiments of rapid cloning. For example, there may be a number of N-modules and D-modules of node 210A that does not reflect a one-to-one correspondence between the N- and D-modules of node 210B. As such, the description of a node comprising one N-module and one D-module for each node should be taken as illustrative only.

Figure 3:
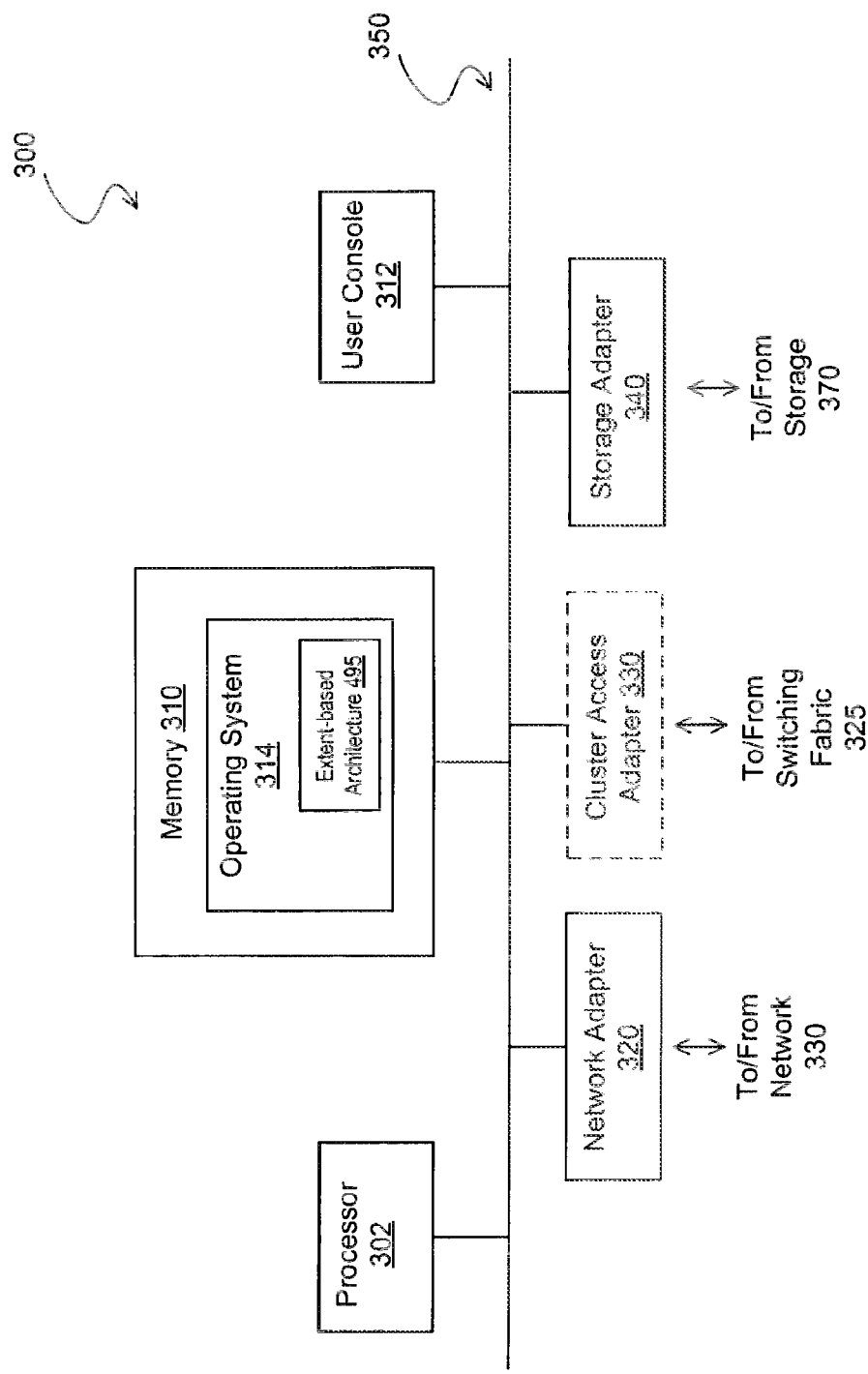
FIG. 3 is a block diagram of an illustrative embodiment of the hardware architecture of a storage server in which an extent-based storage architecture may be implemented.

FIG. 3 is a block diagram of an embodiment of a storage server 300, such as storage servers 210A and 210B of FIG. 2A, embodied as a general or special purpose computer including a processor 302, a memory 310, a network adapter 320, a User console 312 and a storage adapter 340 interconnected by a system bus 350, such as a convention Peripheral Component Interconnect (PCI) bus. Certain standard and well-known components, which are not germane to the understanding of embodiments of the present invention, are not shown.

The processor 302 is the central processing unit (CPU) of the storage server 210 and, thus, control its overall operation. The processor 302 accomplishes this by executing software stored in memory 310. For one embodiment, multiple processors 302 or one or more processors 302 with multiple cores are included in the storage server 210. For one embodiment, individual adapters (e.g., network adapter 320 and storage adapter 340) each include a processor and memory for carrying out respective module operations.

Memory 310 includes storage locations addressable by processor 302, network adapter 320 and storage adapter 340 for storing processor-executable instructions and data structures associated with implementation of an extent-based storage architecture. Storage operating system 314, portions of which are typically resident in memory 310 and executed by processor 302, functionally organizes the storage server 210 by invoking operations in support of the storage services provided by the storage server 210. It will be apparent to those skilled in the art that other processing means may be used for executing instructions and other memory means, including various computer readable media, may be used for storing program instructions pertaining to the inventive techniques described herein. It will also be apparent that some or all of the functionality of the processor 302 and executable software can be implemented by hardware, such as integrated currents configured as programmable logic arrays, ASICs, and the like.

Network adapter 320 comprises one or more ports to couple the storage server to one or more clients over point-to-point links or a network. Thus, network adapter 320 includes the mechanical, electrical and signaling circuitry needed to couple the storage server to one or more client over a network. The network adapter 320 may include protocol components such as a Media Access Control (MAC) layer, Common Internet File System (CIFS), Network File System (NFS), Internet Protocol (IP) layer, Transport Control Protocol (TCP) layer, User Datagram Protocol (UDP) layer, and other protocols known in the art for facilitating such connectivity. Each client may communicate with the storage server over the network by exchanging discrete frames or packets of data according to pre-defined protocols, such as TCP/IP.

Storage adapter 340 includes a plurality of ports having input/output (I/O) interface circuitry to couple the storage devices (e.g., disks) to bus 321 over an I/O interconnect arrangement, such as a conventional high-performance, FC or SAS link topology. Storage adapter 340 typically includes a device controller (not illustrated) comprising a processor and a memory for controlling the overall operation of the storage units in accordance with read and write commands received from storage operating system 314. In one embodiment, the storage operating system 314 implements an extent-based storage architecture 495, as will be described in greater detail below. As used herein, data written a device controller in response to a write command is referred to as "write data," whereas data read by device controller responsive to a read command is referred to as "read data."

User console 312 enables an administrator to interface with the storage server to invoke operations and provide inputs to the storage server using a command line interface (CLI) or a graphical user interface (GUI). In one embodiment, user console 312 is implemented using a monitor and keyboard.

When implemented as a node of a cluster, such as cluster 220 of FIG. 2B, the storage server further includes a cluster access adapter 330 (shown in phantom/broken lines) having one or more ports to couple the node to other nodes in a cluster. In one embodiment, Ethernet is used as the clustering protocol and interconnect media, although it will be apparent to one of skill in the art that other types of protocols and interconnects can by utilized within the cluster architecture.

Figure 4:
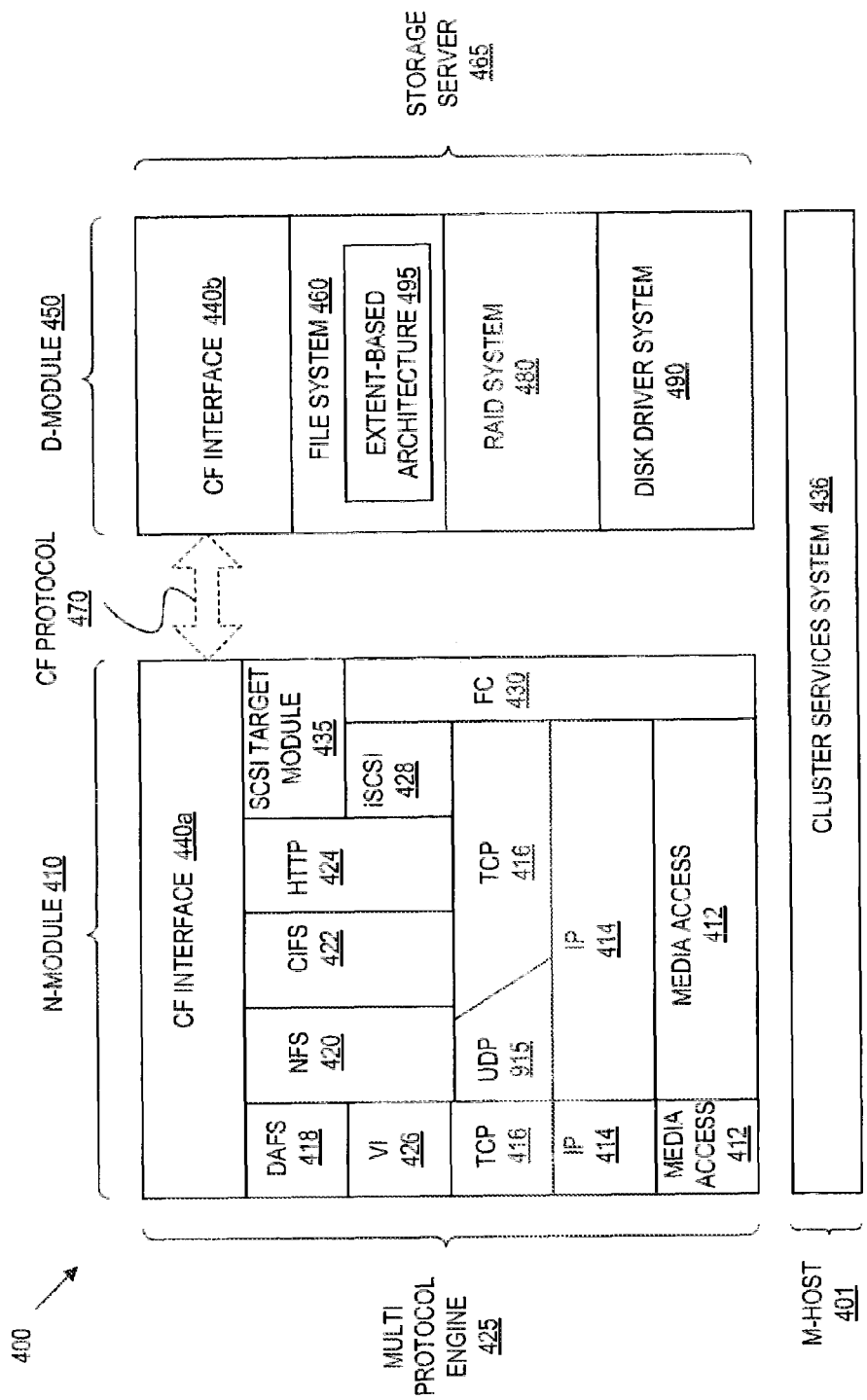
FIG. 4 illustrates an embodiment of the storage operating system of FIG. 3 in which an extent-based storage architecture may be implemented.

FIG. 4 is a block diagram of a storage operating system, such as storage operating system 314 of FIG. 3, that implements an embodiment of an extent-based architecture. The storage operating system comprises a series of software layers executed by a processor, such as processor 302 of FIG. 3, and organized to form an integrated network protocol stack or, more generally, a multi-protocol engine 425 that provides data paths for clients to access information stored on the storage server using block and file access protocols.

Multi-protocol engine 425 includes a media access layer 412 of network drivers (e.g., gigabit Ethernet drivers) that interface with network protocol layers, such as the IP layer 414 and its supporting transport mechanisms, the TCP layer 416 and the User Datagram Protocol (UDP) layer 415. A file system protocol layer provides multi-protocol file access and, to that end, includes support for one or more of the Direct Access File System (DAFS) protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418. An iSCSI driver layer 428 provides block protocol access over the TCP/IP network protocol layers, while a FC driver layer 430 receives and transmits block access requests and responses to and from the storage server. In certain cases, a Fibre Channel over Ethernet (FCoE) layer (not shown) may also be operative in multi-protocol engine 425 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing data blocks on the storage server.

The storage operating system also includes a series of software layers organized to form a storage server 465 that provides data paths for accessing information stored on storage devices. Information may include data received from a client, in addition to data accessed by the storage operating system in support of storage server operations such as program application data or other system data. Preferably, client data may be organized as one or more logical storage objects (e.g., volumes) that comprise a collection of storage devices cooperating to define an overall logical arrangement. In one embodiment, the logical arrangement may involve logical volume block number (VBN) spaces, wherein each volume is associated with a unique VBN.

The file system 460 implements a virtualization system of the storage operating system through the interaction with one or more virtualization modules (illustrated as a SCSI target module 435). The SCSI target module 435 is generally disposed between drivers 428, 430 and the file system 460 to provide a translation layer between the data block (lun) space and the the system space, where luns are represented as data blocks. In one embodiment, the file system 460 implements a WAFL file system having an on-disk format representation that is block-based using, e.g., 4 KB blocks and using a data structure such as index nodes ("inodes") to identify files and file attributes (such as creation time, access permissions, size and block location). File system 460 uses files to store metadata describing the layout of its file system, including an inode file, which directly or indirectly references (points to) the underlying data blocks of a file.

For one embodiment, the file system 460 includes an extent-based architecture 495 as an extension to WAFL. Operationally, a request from a client is forwarded as a packet over the network and onto the storage server where it is received at a network adapter. A network driver such as layer 412 or layer 430 processes the packet and, if appropriate, passes it on to a network protocol and file access layer for additional processing prior to forwarding to file system 460. There, file system 460 generates operations to load (retrieve) the requested data from the disks if it is not resident "in core", i.e., in memory 310. If the information is not in memory, file system 460, in cooperation with the extent-based architecture 495, accesses an indirect volume to retrieve an extent identifier, accesses an extent-to-physical block map to retrieve a PVBN as described in greater detail with reference to FIGS. 5-14. For one embodiment, the file system 460 passes the PVBN to the RAID system 480. There, the PVBN is mapped to a disk identifier and device block number (disk, DBN) and sent to an appropriate driver of disk driver system 490. The disk driver accesses the DBN from the specified disk and loads the requested data block(s) in memory for processing by the storage server. Upon completion of the request, the node (and operating system 400) returns a reply to the client over the network.

It should be noted that the software "path" through the storage operating system layers described above needed to perform data storage access for the client request received at the storage server adaptable to the teachings of the invention may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by the storage server in response to a request issued by a client. Moreover, in another alternate embodiment of the invention, the processing elements of adapters 320, 340 may be configured to offload some or all of the packet processing and storage access operations, respectively, from processor 302, to thereby increase the performance of the storage service provided by the storage server. It is expressly contemplated that the various processes, architectures and procedures described herein can be implemented in hardware, firmware or software.

When implemented in a cluster, data access components of the storage operating system may be embodied as D-module 450 for accessing data stored on disk. In contrast, multi-protocol engine 425 may be embodied as N-module 410 to perform protocol termination with respect to a client issuing incoming access over the network as well as to redirect the access requests to any other N-module in the cluster. A cluster services system 436 may further implement an M-host (e.g., M-host 401) to provide cluster services for generating information sharing operations to present a distributed file system image for the cluster. For instance, media access layer 412 may send and receive information packets between the various cluster services systems of the nodes to synchronize the replicated databases in each of the nodes.

In addition, a cluster fabric (CF) interface module 440 (CF interface modules 440A, 440B) may facilitate intra-cluster communication between N-module 410 and D-module 450 using a CF protocol 470. For instance, D-module 450 may expose a CF application programming interface (API) to which N-module 410 (or another D-module not shown) issues calls. To that end, CF interface module 440 can be organized as a CF encoder/decoder using local procedure calls (LPCs) and remote procedure calls (RPCs) to communicate a file system command to D modules residing on the same node and remote nodes, respectively.

Although embodiments of the present invention are shown herein to implement an extent-based architecture within the illustrated components and layers of a storage server, it will be appreciated that an extent-based architecture may be implemented in other modules or components of the storage server in other embodiments. In addition, an extent-based architecture may be implemented as one or a combination of a software-executing processor, hardware or firmware within the storage server. As such, an extent-based architecture may directly or indirectly interface with modules of the storage operating system in accordance with teachings of the present invention.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows®, or as a general-purpose operating system with configurable functionality, which is configured for storage applications as described herein.

In addition, it will be understood to those skilled in the art that the invention described herein may apply to any type of special-purpose (e.g., file server or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the present invention may be utilized with any suitable file system, including conventional write-in-place file systems.

Figure 5:
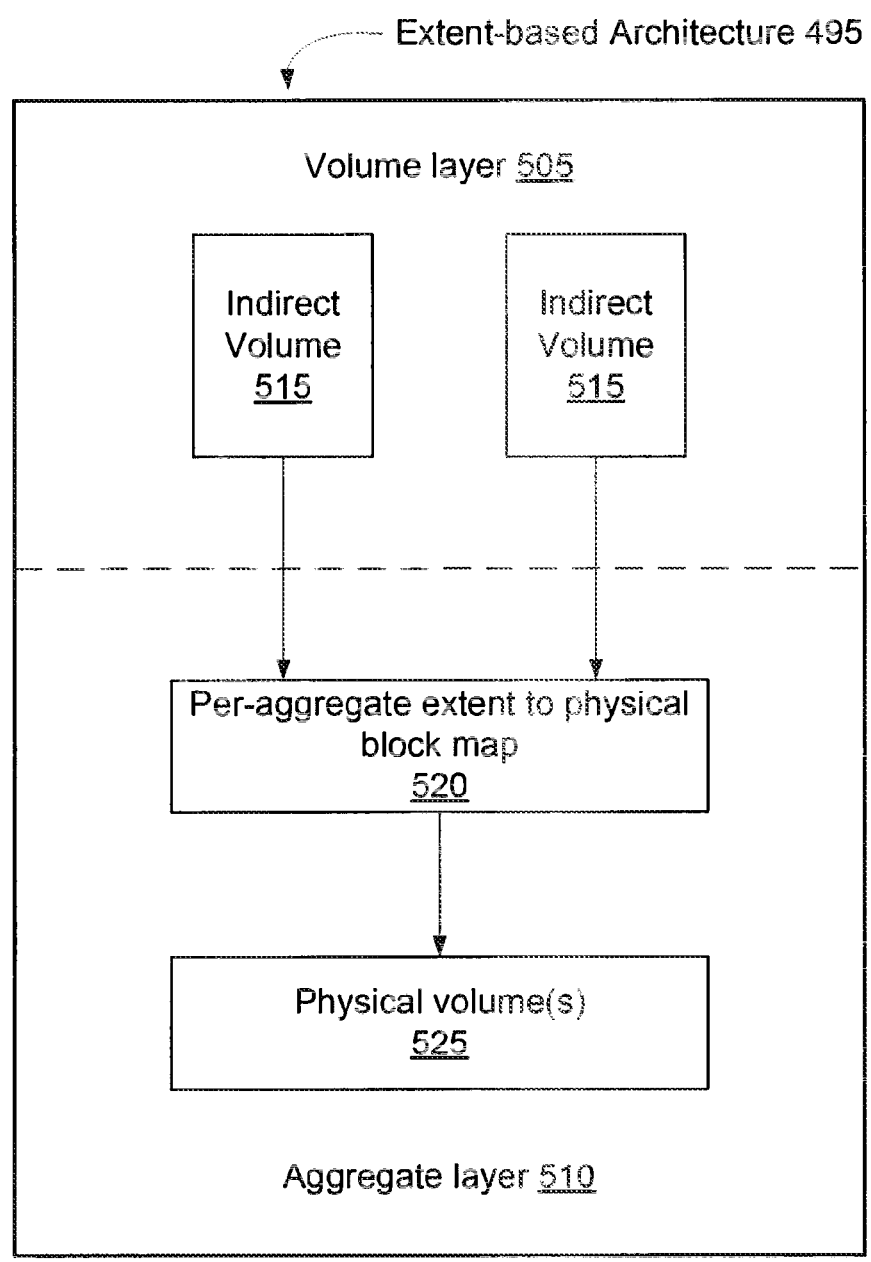
FIG. 5 illustrates an exemplary block diagram of an extent-based storage architecture.

FIG. 5 illustrates an exemplary block diagram of an extent-based storage architecture 495. The extent-based architecture 495 includes a volume layer 505 and an aggregate or region manager layer 510. The volume layer 505 includes one or more indirect volumes 515 to indirectly map an I/O request from a client 202 to one or more physical blocks within the storage disks 271. For one embodiment, the storage server 210 uses one entry in the indirect volumes 515 for each extent, as opposed to prior art block-based implementations that used one indirect volume entry (e.g., in a flexible volume 110) for each data block. For one embodiment, the I/O request references data by way of a file block number (FBN). An FBN refers to a data block in a volume 515 as referenced by a client 202. The storage server 210 uses the FBN as a key to access an extent identifier. An extent refers to a contiguous group of one or more data blocks in FBN space. The aggregate layer 510 includes an extent-to-physical block map 520 and one or more physical volumes 525. The extent-to-physical block map 520 maps an extent identifier (e.g., accessed by way of an FBN in the volume layer 505) to a pointer to another extent or to one or more physical volume block numbers (PVBN) in the physical volume 525.

The extent-based entries of the extent-to-physical block map 520 provide per-aggregate indirection. In contrast, virtual volume block numbers (VVBN) of volume containers 120 provide per-volume indirection. A per-aggregate extent-based entry, as used herein, refers to an extent being unique across volume boundaries within an aggregate. A per-volume indirect entry refers to an entry being unique within volume boundaries. For per-aggregate indirection, when the storage server 210 copies, moves, or makes other changes to physical blocks, the changes are reflected within the aggregate layer 510 in the extent-to-physical block map 520. These changes, however, do not need to be propagated into the volume layer 505 because the extent identifier does not need to change. This enables compression, decompression, sharing, and the termination of sharing of extents to occur without communication with the volume layer 505. Blocks can be easily shared across volume boundaries, enabling cross-volume deduplication. Segment cleaning and related disk gardening techniques can be performed on the extent-to-physical block map 520 in a single pass, all without having to propagate changes up into the volume layer 305.

Figure 6:
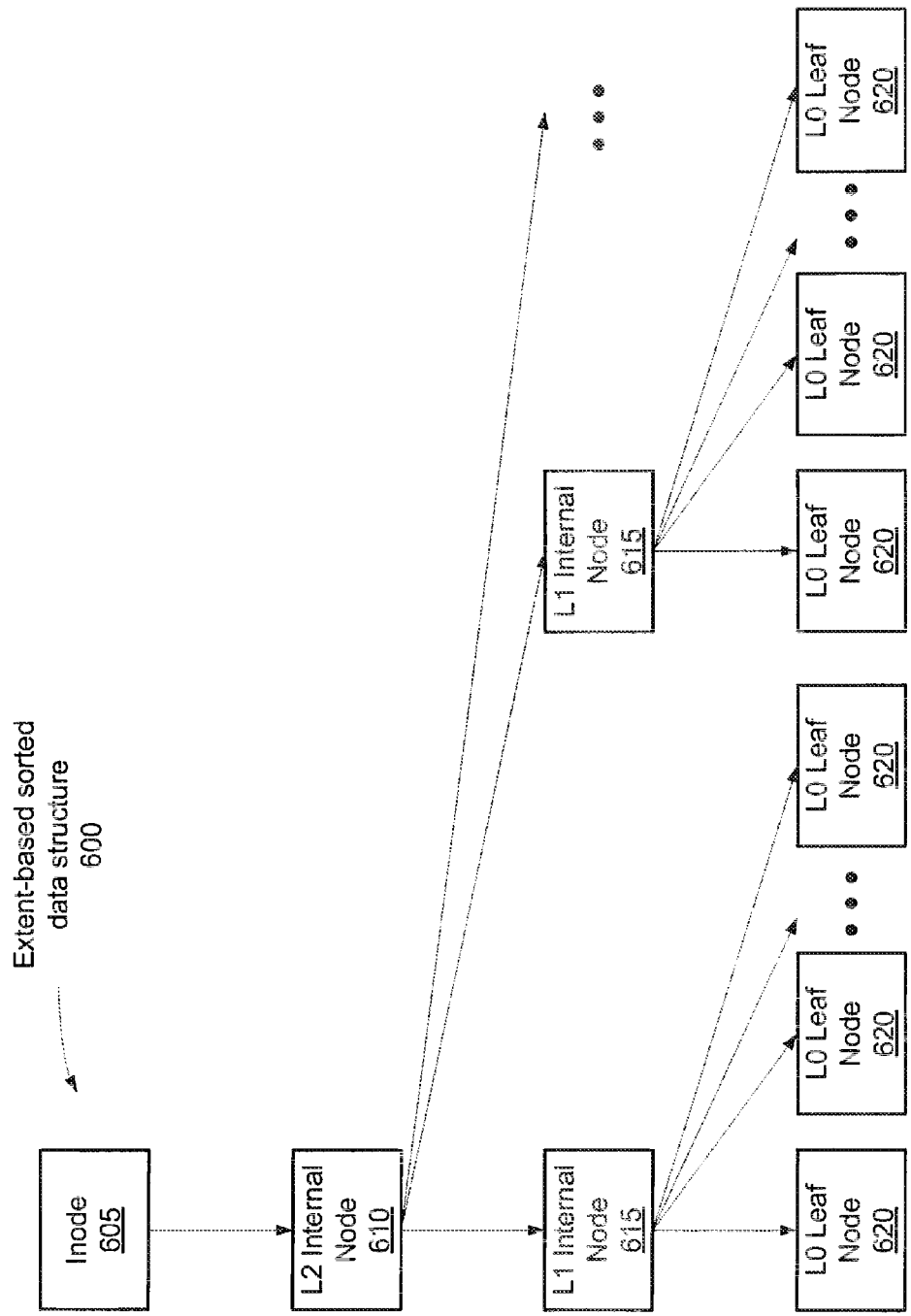
FIG. 6 illustrates an exemplary extent-based sorted data structure within an extent-based storage architecture.

FIG. 6 shows an exemplary extent-based sorted data structure 600 within an extent-based storage architecture. For one embodiment, the extent-based sorted data structure is a B+ tree. Alternatively, the extent-based sorted data structure 600 is another type of tree or sorted data structure that is able to perform lookup and modify operations in, at most, O(log n) time, where n is the number of data blocks in a file. An inode 605 points to the root of the extent-based tree/sorted data structure 600 and contains volume/file metadata and pointers to data blocks 620 or indirect blocks 610/615. For example, in a B+ tree, indirect blocks are referred to as internal nodes 610/615 and data blocks are referred to as leaf nodes 620. For one embodiment, the inode 605 points to one or more branches of internal nodes 610/615. For an alternate embodiment, the inode 605 points directly to the leaf nodes 620. For one embodiment, the internal nodes 610/615 store pointers to other nodes but do not store data, e.g. data such as an FBN, extent identifier, PVBN, etc. The leaf nodes 620, on the other hand, store data, e.g. data such as an FBN, extent identifier, PVBN, etc.

For one embodiment, the lengths of extents vary. For one embodiment the length of an extent is expressed as the number of data blocks of a fixed size within the extent. For example, an extent containing only a single 4 KB block could have a length of 1, an extent containing two 4 KB blocks would have a length of 2, etc. For one embodiment, extents have a maximum length driven by user I/O or write allocation (e.g., extents having a maximum length of 64 blocks). For an alternate embodiment, the length of extents may be consistently defined (e.g., 8 blocks).

For an embodiment utilizing an extent-based tree 600 with variable-length extents, the height of the tree is variable, even between two files of the same size. For one embodiment, the span of an internal node 610/615 is also variable. As used herein, the span of an indirect block refers to the number of blocks to which that indirect block refers. As a comparison, in previous implementations of WAFL the span of an indirect block is fixed: the span of a tradvol indirect block is 1024 blocks, the span of a flexvol indirect block is 510 blocks (e.g., as stored in flexible volume 110), and the span of a 64-bit flexvol indirect block is 255 blocks (e.g., as stored in flexible volume 110).

Additionally, in the previous implementations of WAFL, a contiguous extent containing N blocks would use the same amount of indirect space as N randomly located blocks because each data block of the extent would be represented by a separate indirect entry in the volume layer. An extent-based sorted data structure 600, however, greatly reduces the amount of indirect space used because volume layer entries are per-extent rather than per-block. For example, consider a 64-bit flexvol storing a file containing 532,685,800 bytes of data (approximately 508 MB) as implemented in previous implementations of WAFL. The flexvol includes indirect blocks having 255 entries (a span of 255) and each entry refers to a 4 KB block. The flexvol represents the 508 MB file using two level-2 indirect blocks pointing to 510 level 1 indirect blocks pointing to 130030 4 KB level 0 data blocks. In an extent-based sorted data structure 600, instead of using one entry for each 4 KB block, the storage server 210 uses one entry for each extent. Extents can be longer than a single 4 KB block. For example, an extent is a contiguous group of one or more 4 KB blocks. Using an extent-based sorted data structure 600 with 16 block long extents and 127 entries per block, the storage server 210 represents the 130050 4 KB with only 8129 leaf nodes 620 and 65 internal nodes 610/615, resulting in an 87% savings in indirect block metadata.

For one embodiment, the storage server 210 uses an extent-based sorted data structure 600 to implement an indirect volume 515. For one embodiment, the storage server 210 implements each indirect volume 515 as a B+ tree. FIG. 7 shows an exemplary volume layer indirect entry 700 for a leaf node 620 of an extent-based data structure 600 used to implement an indirect volume 515. The volume layer indirect entry 700 stores an FBN 705, a corresponding extent identifier 710, and a length of the extent 715. The storage server 210 uses the FBN 705 as the primary sorting key to navigate the extent-based sorted data structure 600 and find the extent identifier 710 that corresponds to the FBN 705. For one embodiment, the FBN 705 is 48 bits, the extent identifier 710 is 48 bits, and the length 715 is 8 bits. Alternatively, the storage server 210 uses different sizes for one or more of the FBN 705, extent identifier 710, or length 715. For example, the extent identifier 710 may be 64 bits long in an alternate embodiment to, e.g., provide for 512 byte granularity in the offsets of blocks. For one embodiment, extent lengths 715 vary. For an alternate embodiment, extent lengths 715 are fixed.

For one embodiment, the FBN 705 is 51 bits to provide for 512 byte granularity in the offsets of blocks (where a 48 bit FBN 705 provides for 4 KB byte granularity of FBN offsets). Because the storage server 210 stores indirect blocks using an extent-based sorted data structure 600, FBN's do not need to be aligned based upon block size (e.g., 512 byte offset alignment and 4 KB blocks). The extent-based sorted data structure 600 stores an entry for an entire extent based upon an FBN and length of the extent. The extent-based sorted data structure 600 does not store only the block at that FBN and then require subsequent entries to correspond to each subsequent FBN. For example, given two adjoining extents that are each 16 blocks in length, the entries in the extent-based sorted data structure 600 for these two extents will have FBN's that are offset by at least 16 blocks. In traversing the extent-based sorted data structure 600, the storage server 210 does not need to assume that each entry is separated by the same offset or that an entry's FBN is offset by a whole number multiple of e block size. Additionally, the savings in indirect metadata resulting from using an extent-based sorted data structure 600 compensates for the use of three additional bits for each FBN 705. Providing the 512 byte offset granularity within the volume layer eliminates the previously described complications resulting from misalignment between blocks in FBN space and blocks in aggregate space. Once an FBN is mapped to an extent identifier 710, the extent identifier can be mapped to an extent (as described below) without concern of misalignment because the aggregate layer maintains a consistent block-sized alignment of offsets within the aggregate.

The storage server 210 allocates extent identifiers 710 during write allocation. For one embodiment, the storage server 210 allocates extent identifiers 710 from a finite pool. Alternatively, extent identifiers 710 are monotonically increasing values that never wrap.

For one embodiment, the length 715 of an extent is used for a consistency check as described with reference to FIG. 8 below.

The per-volume container files 120 of previous implementations of WAFL are not used in an extent-based sorted data structure 600 used to implement an indirect volume 515. Instead of per-volume container files 120, the storage server 210 uses an extent-to-physical block map 520. As described above, the use of the extent-to-physical block map 520 can result in reduced indirect metadata. The indirect volume blocks, however, no longer contain cached pointers to PVBN's. Accesses to an extent involves the storage server 210 looking up an extent identifier 710 in the indirect volume 515 and looking up the PVBN (e.g., by way of a pointer) in the extent-to-physical block map 520. The computational overhead of this additional I/O look-up is offset by some of the features of extent-based architecture 495. For example, I/O accesses are per extent rather than per block and, therefore, multiple blocks are accessed by a single I/O access of each the indirect volume 515 and the extent-to-physical block map 520. Additionally, the extent-based architecture 495 gains advantages in compression, deduplication, segment cleaning, etc., which can be performed with altering the extent identifier 710. Actions such as deduplication can easily span the aggregate rather than just a single volume and many changes to blocks, e.g., resulting from compression and segment cleaning, do not need to be propagated up to the indirect volume 515 (e.g., to correct cached indirect pointers as in previous implementations of WAFL).

For one embodiment, the storage server 210 uses an extent-based sorted data structure 600 to implement an extent-to-physical block map 520. For one embodiment, the storage server 210 implements an extent-to-physical block map 520 as a B+ tree. FIG. 8 shows an exemplary extent map entry 800 for a leaf node 620 of an extent-based sorted data structure 600 used to implement an extent-to-physical block map 520. Leaf nodes 620 of an extent-based sorted data structure 600 used to implement an extent-to-physical block map 520 store extent identifiers 805, references 810 such as pointers to PVBN's or other extent identifiers, offsets for the extents 815, and lengths for the extents 820. As used herein, an offset for an extent is a distance in blocks from the first block of the contiguous group of blocks that make up an extent. For one embodiment, the extent identifier 805 is 48 bits, the pointer/extent identifier 810 is 48 bits, the offset 815 is 8 bits, and the length 820 is 8 bits. For an alternate embodiment, different numbers of bits are used for each portion of an extent map entry 800.

For one embodiment, each extent map entry 800 includes either a pointer or other reference 810 directly to a PVBN or to another extent identifier 805 that directly references a PVBN. For one embodiment, each PVBN is owned by only one extent and any other extent that references the PVBN does so by way of referencing the owner extent. As a result, the maximum additional look-up for a given extent to get to a PVBN should be no more than one. This maximum prevents the level of indirect references in extent map entries 800 from becoming arbitrarily deep and taking an arbitrary amount of time (as measured in terms of disk I/O operations, assuming that each extent entry is likely to be stored within a different disk block). As a result of extents having a single owner, the storage server 210 can use the owner extent identifier as a tag, unique number, or other context for the purpose of lost write detection.

For an alternate embodiment, all extent identifiers 805 map directly to a PVBN and PVBN's can be owned by more than one extent. For an embodiment including lost write detection, the storage server 210 creates a context, tag, or unique number, e.g., via a separate table, that is separate/different from the extent identifiers 805 due to the possibility of multiple extent identifiers referencing a single PVBN.

For one embodiment, the storage server 210 cheeks data consistency by comparing the length 715 of an extent as stored in the volume layer 505 with the length 820 of the extent as stored in the aggregate layer 510.

For one embodiment, the storage server 210 utilizes a finite number of extent identifiers. If an extent identifier is a candidate to be reused, e.g., upon a request to delete the extent, the storage server 210 first determines whether or net other extents refer to that extent identifier. If one or more extents reference the candidate extent identifier, the storage server 210 ensures that the one or more extents continue to point to the same data (e.g., by altering one of the extents to directly reference the corresponding PVBN and the other extents to reference that altered extent). For one embodiment, the storage server 210 maintains, e.g, in one or more metafiles, reference counts for references by extents to each extent and by extents to each PVBN. Reference counts enable the storage server 210 to be aware of whether or not other extents would be affected by operations performed on an extent/PVBN (e.g., reallocation, segment cleaning, etc.). The storage server 210 tracks increments and decrements of the reference count in one or more log files. For example, the storage server 210 would increment a reference count when a new extent/PVBN is allocated, when an extent identifier is shared (e.g., via clone creation, snapshot creation, or deduplication), etc. For one embodiment, the storage server 210 accumulates increments and decrements using a log file and makes batch updates to reference count metafiles, e.g., at a consistency point. For one embodiment, the storage server 210 increments a reference count from 0 to 1 for a PVBN directly (bypassing the log file) when allocating a new extent/PVBN and executes all other increments and decrements of the reference counts via the respective reference count log file.

Figure 9:
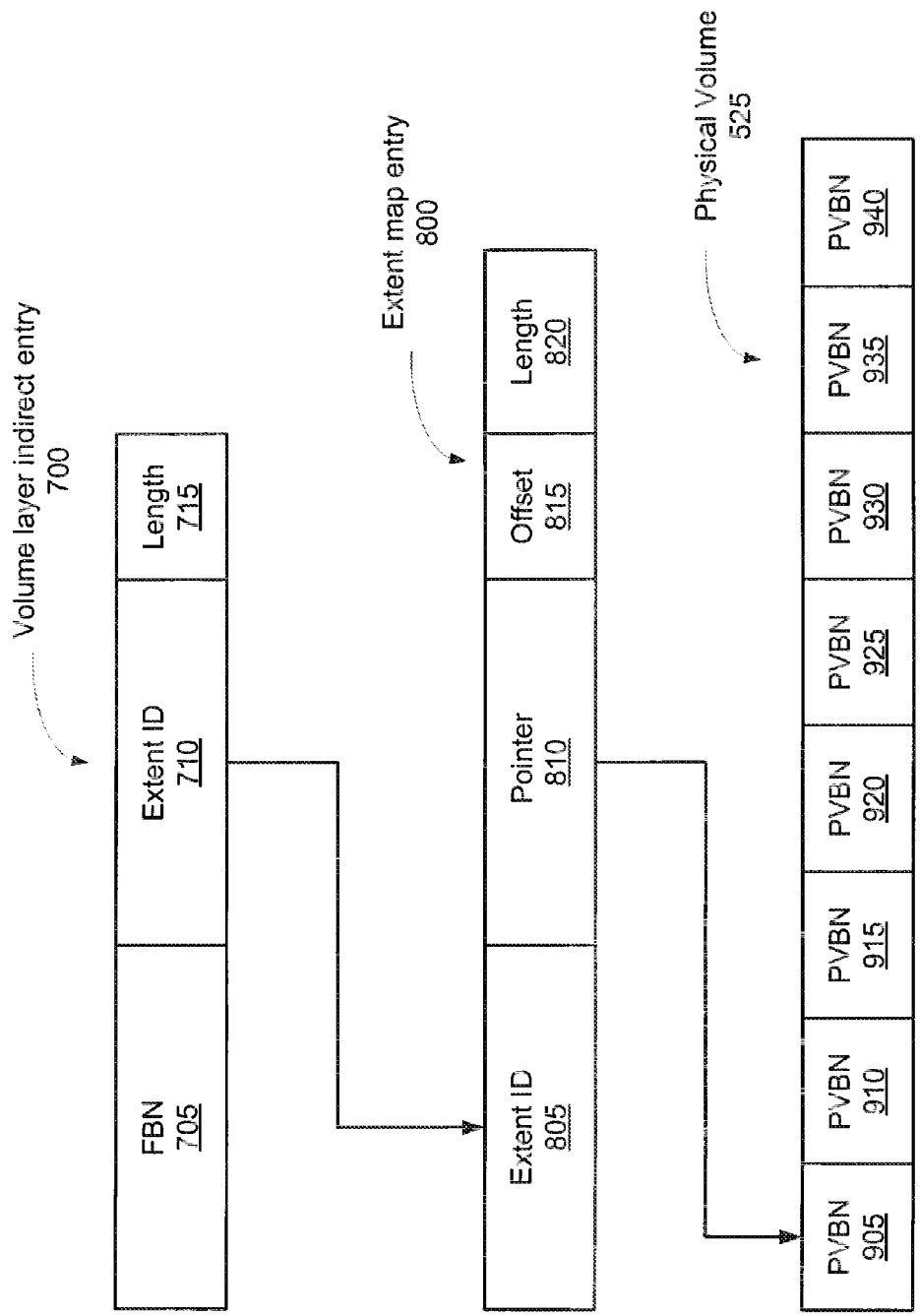
FIG. 9 illustrates an exemplary sequence of look ups in the volume layer and aggregate layer of an extent-based storage architecture to map an FBN to a PVBN.

FIG. 9 shows an exemplary sequence of look ups in the volume layer 505 and aggregate layer 510 to map an FBN to a PVBN in the physical volume 525. For example, when the storage server 210 receives an I/O request including an FBN 705, the storage server 210 uses the FBN as a key in an indirect volume 515 to look up an extent identifier 710 in a volume layer indirect entry 700. The storage server 210 uses the extent identifier 710 as a key to look up an extent map entry 800 in an extent-to-physical block map 520. The storage server 210 uses the pointer 810 to access PVBN 905 in the physical volume 525. In this example, the offset 815 is zero. If the offset was a positive value, the storage server 210 would access one or more blocks subsequent to PVBN 905 (e.g., PVBN 910, PVBN 915, etc.). If the length 820 is greater than 1, the storage server 210 would access PVBN 905 and one or more subsequent blocks (e.g., PVBN 910, PVBN 915, etc.).

Figure 10:
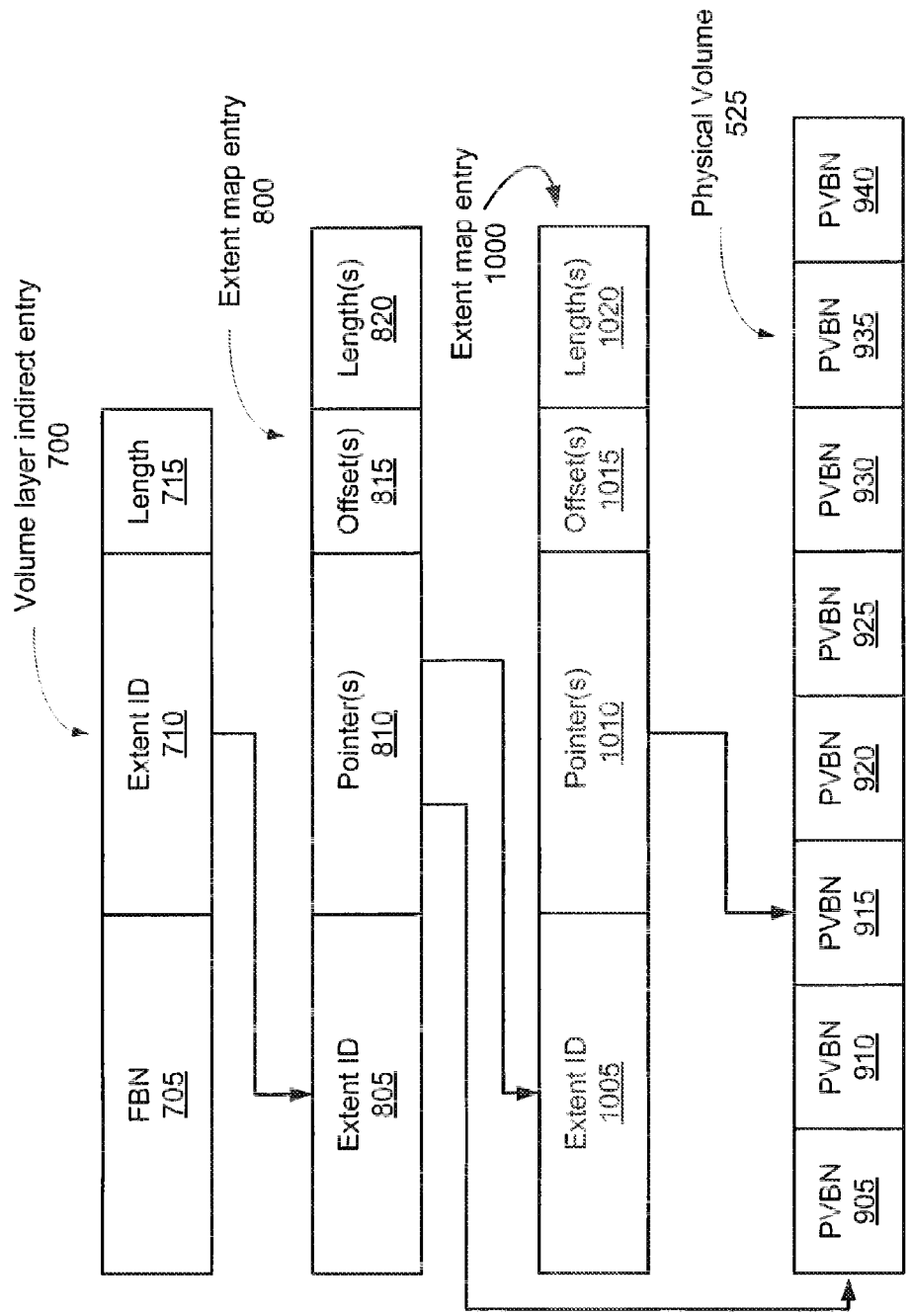
FIG. 10 illustrates another exemplary sequence of look ups in the volume layer and aggregate layer of an extent-based storage architecture to trap an FBN to a PVBN.

FIG. 10 shows another exemplary sequence of look ups in the volume layer 505 and aggregate layer 510 to map an FBN to a PVBN in the physical volume 525. Similar to the example described with reference to FIG. 9, the storage server 210 receives an I/O request including an FBN 705 and uses the FBN as a key in an indirect volume 515 to look up an extent identifier 710 in a volume layer indirect entry 700. The storage server 210 uses the extent identifier 710 as a key to look up a first extent map entry 800 in an extent-to-physical block map 520. In this example, the extent identifier 805 is associated with pointer 810 to a PVBN 905 and a pointer or extent identifier 810 to a second extent map entry 1000. For one embodiment, the first extent has multiple extent map entries 800, one for each pointer or reference 810. For example, each entry 800 would include the same extent identifier 805, but different combinations of pointer 810, offset 815, and length 820. For the sake of simplicity, FIG. 10 illustrates a single extent map entry that includes multiple pointers 810, offsets 815, and lengths 820. The storage server 210 uses the pointer 810 to access PVBN 905 in the physical volume 525. The storage server 210 uses the extent identifier 810 to look up the second extent map entry 1000 in the extent-to-physical block map 520. The storage server 210 uses the pointer 1010 to access PVBN 915 in the physical volume 525.

Figure 11:
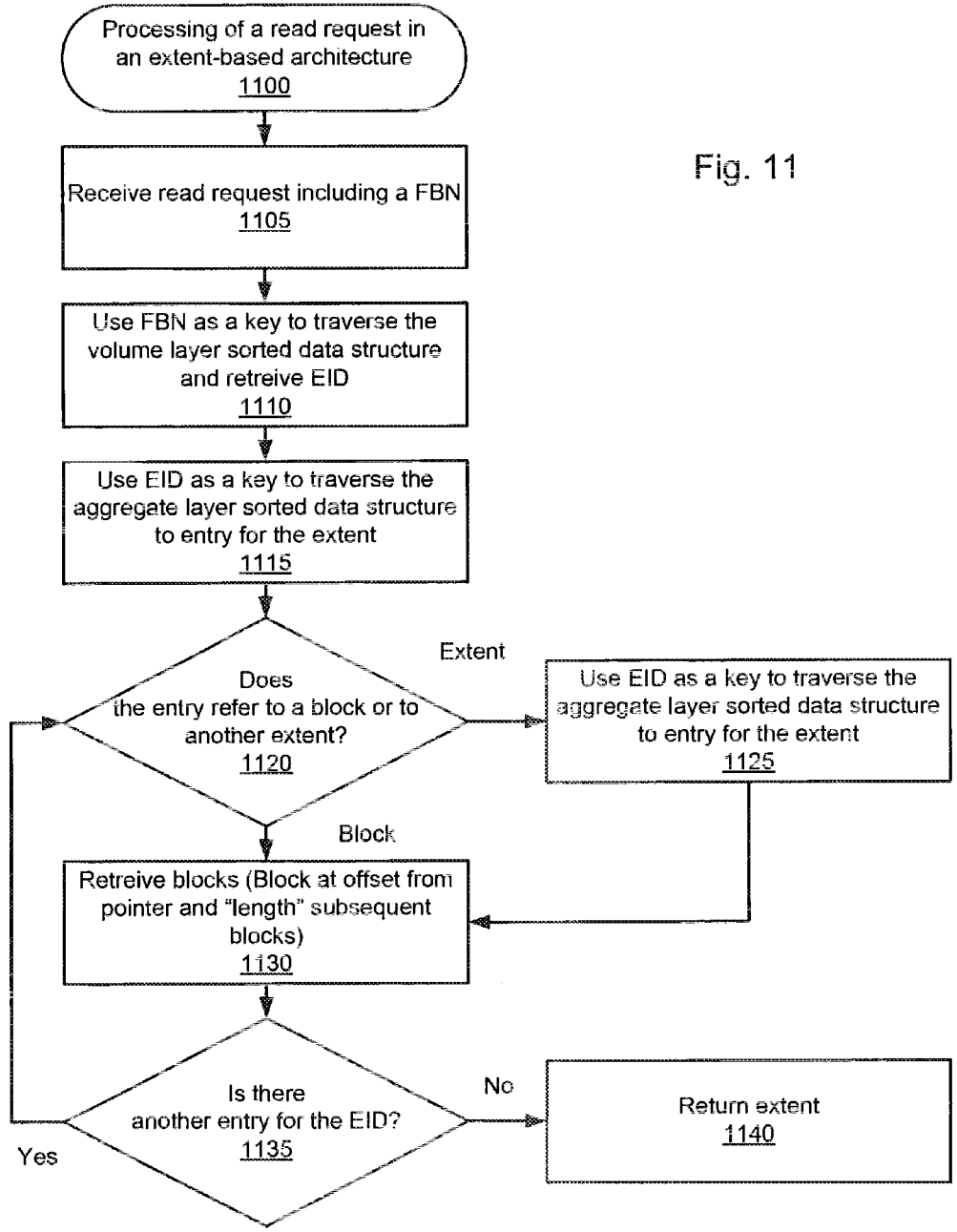
FIG. 11 is an exemplary method of processing a read request in an extent-based architecture.

FIG. 11 is an exemplary method 1100 of processing a read request in an extent-based architecture. At processing block 1105, the storage server 210 receives a read request including an FBN from a client 202. For one embodiment, the read request includes a number of data blocks to be read. Alternatively, the read request assumes a predefined number of data blocks will be returned (e.g., the entire extent as defined by the length 715/820 of the extent, the blocks that follow the FBN to the end of the extent, etc.). At processing block 1110, the storage server 210 uses the FBN to traverse the volume layer extent-based sorted data structure 600 (e.g., indirect volume 515) and retrieves an extent identifier 710 that corresponds to the FBN. If the FBN included in the read request matches exactly with FEN 705 stored in the volume layer extent-based sorted data structure 600, the storage server 210 processes the read request based upon the extent identifier 710 and an offset of zero. If the read request includes an FBN that doesn't match the FBN 705 stored in the volume layer extent-based sorted data structure 600, but the requested FBN and set of data blocks are contained within or overlap with an existing extent, the storage server 210 determines the offset between the FBN included in the read request and the FBN 705 stored in the volume layer extent-based sorted data structure 600 that references the overlapping extent. The storage server 210 processes the read request using the retrieved extent identifier 710 and the determined offset. At processing block 1115, the storage server 210 uses the retrieved extent identifier 710 to traverse the aggregate layer extent-based sorted data structure 600 (e.g., extent-to-physical block map 520) and retrieves a corresponding entry 800 for the extent. At decision block 1120, the storage server determines whether or not the entry 800 identifies or otherwise refers to a data block (e.g., a pointer to a PVBN) or to another extent (e.g. using a second extent identifier). If the entry 800 refers to an extent, at processing block 1125, the storage server 210 uses the second extent identifier 810 to traverse the aggregate layer extent-based sorted data structure 600 to retrieve the second extent entry. As discussed above, for one embodiment, a first entry 800 will refer to a second entry 1000 that, in turn, refers to a data block (but not to a second entry 1000 that refers to a third entry). If the first entry 800 refers to a data block 905, or upon retrieving the second entry 1000, the storage server 210, at processing block 1130, retrieves one or more data blocks using the reference. At decision block 1135, the storage server 210 determines if there is another entry 800 in the aggregate layer extent-based sorted data structure 600 that includes the retrieved extent identifier 710. If there is another entry 800 in the aggregate layer extent-based sorted data structure 600 that includes the retrieved extent identifier 710, the storage server 210 continues to retrieve blocks of data at decision block 1120 as described above. If there is no additional entry 800 in the aggregate layer extent-based sorted data structure 600 for the retrieved extent identifier 710, the storage server 210 returns the requested extent/data blocks to the client 202 at processing block 1140.

For example, referring to FIG. 9, upon receipt of a read request for four blocks at an FBN that matched the FBN 705, the storage serer 210 would process the request by traversing the volume layer and aggregate layer extent-based sorted data structures 600 to retrieve, respectively, a extent identifier 710 and a reference 810 referring to a PVBN 905. The storage server 210 would retrieve PVBN's 905, 910, 915, and 920 and return them to the client 202. Similarly, if the first extent map entry 800 referred to a second extent map entry 1000, the storage server 210 would traverse the aggregate layer extent-based sorted data structure 600 to retrieve a reference 1010 referring to a PVBN 915. The storage server 210 would retrieve PVBN's 915, 920, 925, and 930 and return them to the client 202.

For an example in which the FBN does not match the stored FBN 705, say FBN 705 has a value of 50 and the requested FBN has a value of 51. If the extent associated with FBN 705 has a length of eight blocks and the read request is for four data blocks, the storage server 210 would determine that the extent associated with FBN 705 overlapped with the requested data blocks (e.g., by comparing the FBN 705 and length 715 with the requested FBN and number of blocks requested). The storage server 210 would process the request by traversing the volume layer and aggregate layer extent-based sorted data structures 600 to retrieve, respectively, an extent identifier 710 and a reference 810 referring to PVBN 905. The storage server 210 would add the offset between the requested FBN and the stored FBN 705, which is 1 block, and retrieve the four blocks starting at PVBN 910 (PVBN's 910, 915, 920, and 925).

Figure 12:
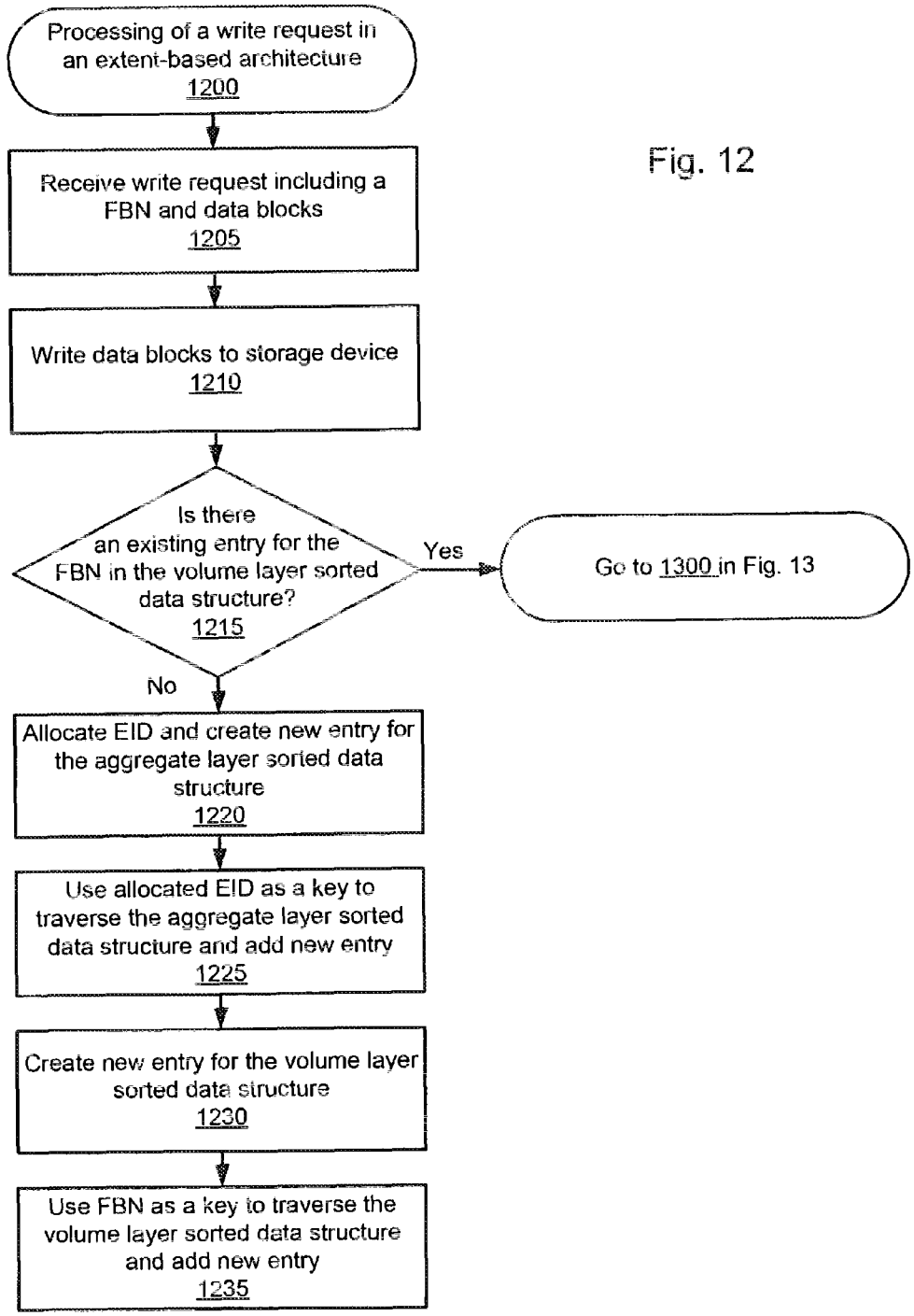
FIG. 12 is an exemplary method of processing a write request in an extent-based architecture.

FIG. 12 is an exemplary method 1200 of processing a write request in an extent-based architecture. At processing block 1205, the storage server 210 receives a write request including an FBN and data blocks to be written from a client 202. For one embodiment, the client 202 provides the data to be written. Alternatively, the client 202 provides a reference to the data to be written. At processing block 1210, the storage server 210 writes the data blocks to a storage device 271. At decision block 1215, the storage server 210 determines if there is an existing entry in the volume layer sorted data structure 600 that includes an FBN 705 that matches or overlaps with the FEIN provided with the write request. If there is a matching or overlapping extent, the storage server proceeds to processing the overwrite request 1300 as described in further detail below with reference to FIG. 13. At processing block 1220, if there is not a matching or overlapping extent, the storage server allocates an extent identifier 805 and creates a new entry 800 for the aggregate layer extent-based sorted data structure 600 (e.g., extent-to-physical block map 520) including the extent identifier 805, a reference 810 to the newly stored extent, an offset 815, and the length 820 of the extent. At processing block 1225, the storage server 210 uses the allocated extent identifier 805 as a key to traverse the aggregate layer extent-based sorted data structure 600 and add the newly created entry 800. At processing block 1230, the storage server 210 creates a new entry 700 for the volume layer extent-based sorted data structure 600 (e.g., indirect volume 515) including the FBN 705 provided with the write request by the client 202, the allocated extent identifier 710/805, and the length 715/820 of the extent. At processing block 1235, the storage server 210 uses the FBN 705 to traverse the volume layer extent-based sorted data structure 600 and add the newly created entry 700. For one embodiment, the storage server 210 returns an indication to the client 202 that the write request was successfully processed.

Figure 13:
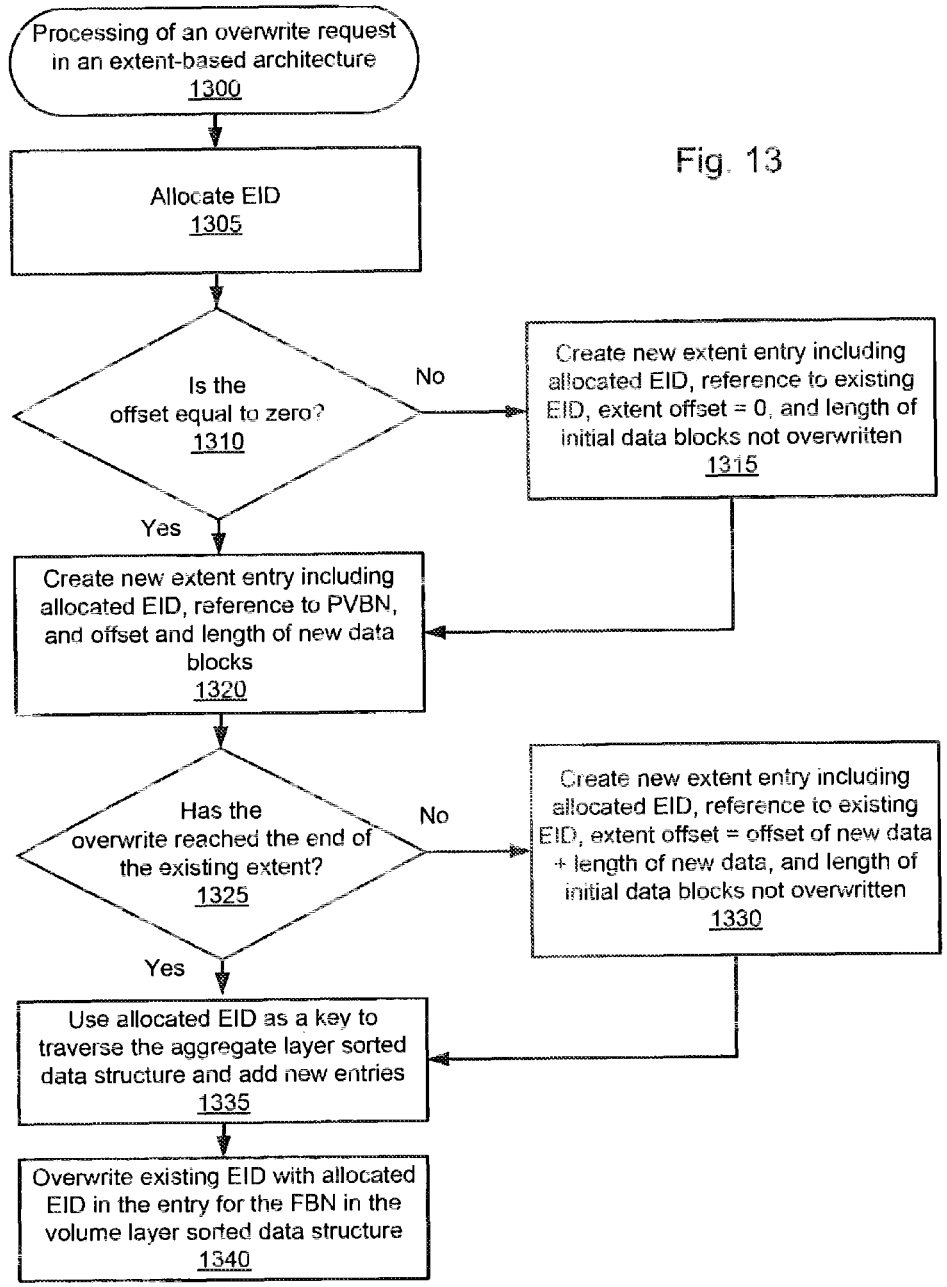
FIG. 13 is an exemplary method of processing an overwrite request in an extent-based architecture.
Figure 14:
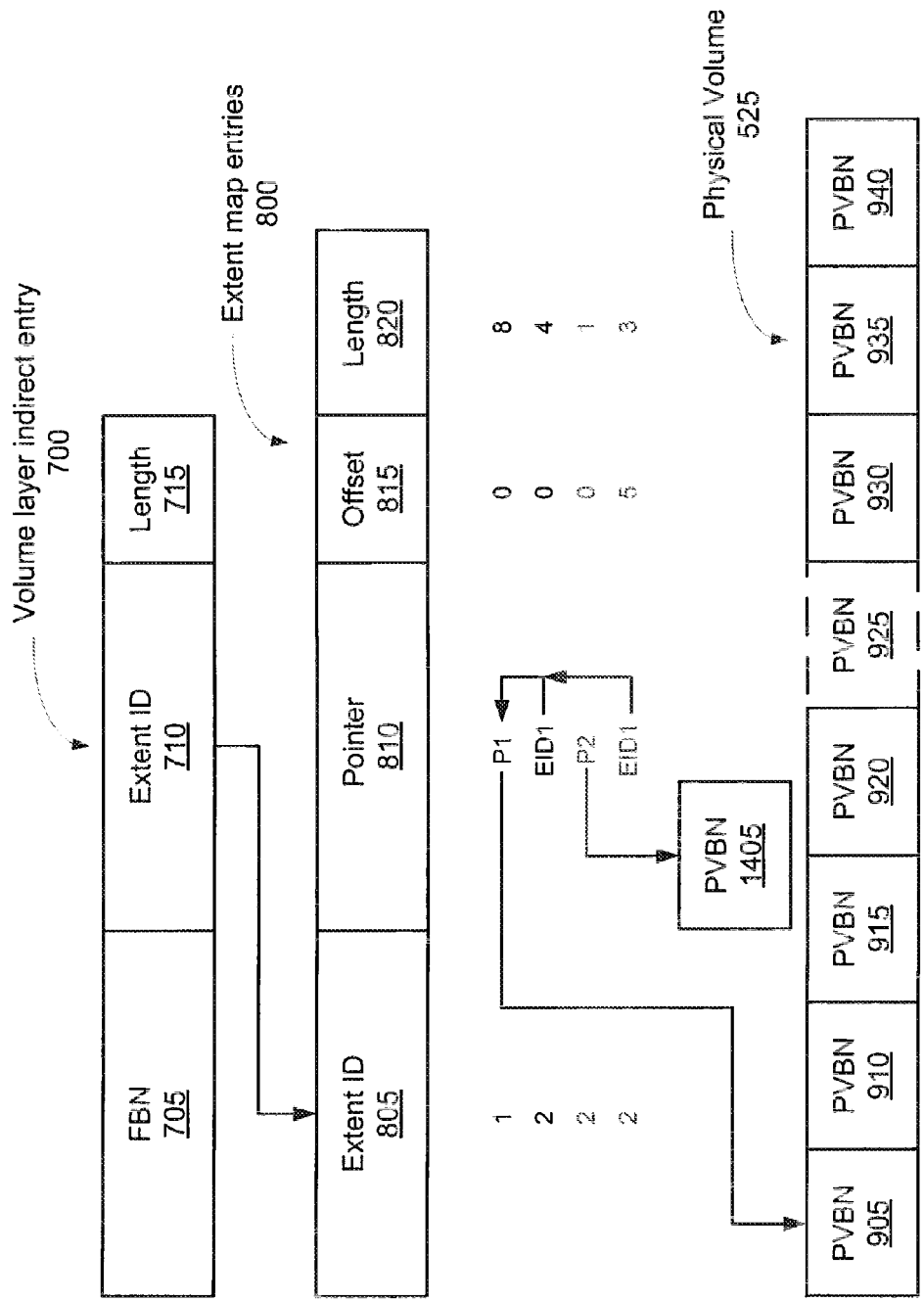
FIG. 14 shows an exemplary partial: overwrite of an extent in an extent-based architecture.

FIG. 13 is an exemplary method 1300 of processing an overwrite request in an extent-based architecture. FIG. 14 illustrates an exemplary partial overwrite of an extent in an extent-based architecture. At processing block 1305, the storage server 210 allocates an extent identifier 805 for the extent/partial extent to be written. At decision block 1310, the storage server 210 determines if the offset between the FBN provided with the write request and the FBN 705 for the overlapping extent is zero. For example, the partial overwrite illustrated in FIG. 14, is directed to an FBN (e.g., a value of 54) that is offset from FBN 705 (e.g. a value of 50) by four data blocks and a request to overwrite a single data block 925.

At processing block 1315, if there is a non-zero offset, the storage server 210 creates a new extent map entry 800 including a newly allocated extent identifier 805, a reference 810 to the existing extent identifier, an offset 815 equal to zero, and a length 820 of the existing data blocks that are not being overwritten (e.g., the value of the offset between the FBN provided with the write request and the FBN 705 for the existing extent). Referring once again to the example in FIG. 14, the storage server allocates extent identifier 2, a reference 810 to the entry 800 for extent identifier 1 (EID 1 points to P1), an initial offset of zero, and a length 820 of four for PVBN's 905-920, which are not being overwritten.

At processing block 1320, if the offset of the FBN provided with the write request from the FBN 705 for the overlapping extent is zero or after creating a new extent map entry 800 for an initial set of blocks not being overwritten, the storage server 210, creates a new extent map entry 800 including the newly allocated extent identifier 805, a reference 810 to the stored data blocks provided with the overwrite request, an offset 815 from the reference 810 where the newly stored data blocks begin, and the length 820 in blocks of the new data. Referring once again to the example in FIG. 14, the storage server allocates extent identifier 2, a reference P2 to newly stored PVBN 1405, an offset of 0, and a length of 1.

At decision block 1325, the storage server 210 determines if the overwrite process has reached the end of the existing extent. For one embodiment, the storage server 210 determines if the sum of the offset from the start of the existing extent for the new data blocks and the length of the new data blocks is greater or equal to length of the existing extent to determine if the end of the existing extent has been reached after completing the overwrite portion of the process 1300. Referring once again to the example in FIG. 14, the new data block has an offset of 4 and length of 1. Given that the sum of the offset and length, five, is less than the length of the existing extent, eight, the remainder of the existing extent would still need to be addressed.

At processing block 1330, if the overwrite has not reached the end of the existing extent, the storage server 210 creates a new extent map entry 800 including the newly allocated extent identifier 805, a reference 810 to the existing extent identifier, an offset 815 equal to the first block of the remainder of existing blocks that are not being overwritten (the offset from the beginning of the existing extent to the first block to be over written + the length of the new data), and a length 820 of the remainder of the existing data blocks that are not being overwritten. Referring once again to the example in FIG. 14, three blocks, PVBN's 930, 935, and 940, are also not being overwritten. The storage server allocates extent identifier 2, a reference 810 to the entry 800 for extent identifier 1 (EID 1 points to P1), an offset of five blocks to refer to PVBN 930 from PVBN 905, and a length 820 of three blocks.

At processing block 1335, the storage server 210 uses the allocated extent identifier 805 as a key to traverse the aggregate layer extent-based sorted data structure 600 and adds the one or more new extent map entries 800. At processing block 1340, the storage server 210 overwrites the existing extent identifier 710 with the allocated extent identifier 805 in the existing entry 700 in the volume layer extent-based sorted data structure 600 associated with the FBN 705 for the overlapping extent.

Referring once again to the example in FIG. 14, the data block at PVBN 925 has been effectively overwritten with the data block PVBN 1405 as illustrated by PVBN 925 being outlined in a dashed line and shaded. The overwrite utilizes block sharing to only write one new data block and use references 810 to access the data blocks that are not overwritten by way of the existing extent. Additionally, the data blocks of the existing extent do not need to be read prior to performing an overwrite operation. For one embodiment, if an extent map entry 800 identifies or otherwise refers to the existing extent map entry 800 that includes reference to the data block at PVBN 925 (e.g., by reference to extent identifier 1), that extent remains unchanged by the overwrite because the existing extent still refers to PVBN 905, with an offset of zero, and a length of eight.

For an alternate embodiment, when the storage server 210 detects an overwrite request, the storage server 210 reads the data blocks that are not being overwritten and rewrites them with the new data blocks as a new extent that can be accessed directly by an extent map entry 800 without relying on block sharing with the existing extent (e.g., without referencing the extent identifier 805 of the existing extent). For one embodiment, the storage server 210 includes a setting to alternate between the block sharing overwrite described above with reference to FIGS. 12-14 and the alternate non-sharing overwrite as a trade off between space efficiency (block sharing) and speed efficiency in subsequent read requests directed at the newly overwritten extent (non-sharing).

Thus, embodiments of an extent-based architecture are implemented in a computer system as described herein. In practice, the methods 1100, 1200, and 1300 may constitute one or more programs made up of computer-executable instructions. The computer-executable instructions may be written in a computer programming language, e.g., software, or may be embodied in firmware logic or in hardware circuitry. The computer-executable instructions to implement a persistent cache may be stored on a machine-readable storage medium. A "computer-readable storage medium," or a "non-transitory computer-readable storage medium," as the terms are used herein, include any mechanism that provides (i.e., stores and/or transmits) information in a form accessible by a machine (e.g., a computer, network device, personal digital assistant (PDA), manufacturing tool, any device with a set of one or more processors, etc.). A "non-transitory computer-readable storage medium," as the term is used herein, does not include a signal, carrier wave, etc. The term RAM as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into RAM/memory during execution of software by a processor. One of skill in the art will immediately recognize that the terms "machine-readable storage medium" and "computer-readable storage medium" include any type of volatile or non-volatile storage device that is accessible by a processor. For example, a machine-readable storage medium includes recordable/non-recordable media (e.g., read-only memory (ROM); random access memory (RAM); magnetic disk storage media; optical storage media; flash memory devices; etc.).

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Therefore, it is manifestly intended that embodiments of this invention be limited only by the following claims and equivalents thereof

What is claimed is:

1. A computerized method comprising:
receiving, by a storage server from a client, a read request for an extent, wherein the extent includes a group of contiguous blocks of data and the read request includes a file block number (FBN);
retrieving, by the storage server, a first extent identifier from a first sorted data structure, wherein the storage server uses the received FBN to traverse the first sorted data structure to the first extent identifier; and
retrieving, by the storage server, a first reference to the first extent from a second sorted data structure, wherein the storage server uses the retrieved first extent identifier to traverse the second sorted data structure to the first reference, and wherein the second sorted data structure is global across a plurality of volumes;
retrieving, by the storage server from a storage device, the extent using the first reference; and
returning, by the storage server, the extent to the client.

2. The computerized method of claim 1, wherein the first reference identifies a physical volume block number (PVBN).

3. The computerized method of claim 2, wherein each PVBN is referenced directly by no more than one extent identifier.

4. The computerized method of claim 1, wherein the first reference identifies a second extent identifier and the second extent identifier includes a second reference that identifies a PVBN.

5. The computerized method of claim 1, wherein the storage server uses the retrieved first extent identifier to traverse the second sorted data structure to multiple references including the first reference, wherein the storage server uses the multiple references to retrieve the extent.

6. The computerized method of claim 1, wherein extents vary in length.

7. A storage server comprising:
a memory;
a processor coupled to the memory through a bus, wherein the processor executes instructions that cause the processor to:
receive a read request from a client for an extent, wherein the extent includes a group of contiguous blocks of data and the read request includes a file block number (FBN);
retrieve a first extent identifier from a first data structure, wherein the storage server uses the FBN to traverse the first data structure to the first extent identifier;
retrieve a first reference to the extent from a second data structure, wherein the storage server uses the first extent identifier to traverse the second data structure to the first reference, and wherein the second data structure is global across a plurality of volumes;

retrieve the extent from a storage device using the first reference; and return the extent to the client.

8. The storage server of claim 7, wherein the first reference identifies a physical block volume number (PVBN).

9. The storage server of claim 8, wherein each PVBN is referenced directly by no more than one extent identifier.

10. The storage server of claim 7, wherein the first reference identifies a second extent identifier and the second extent identifier includes a second reference that identifies a PVBN.

11. The storage server of claim 7, wherein the storage server uses the first extent identifier to traverse the second data structure to multiple references including the first reference, wherein the storage server uses the multiple references to retrieve the extent.

12. The storage server of claim 7, wherein extents vary in length.

13. A non-transitory machine readable medium having stored thereon instructions comprising machine executable code which when executed by one or more processors of a machine, causes the machine to:

receive, from a client, a read request for an extent, wherein the extent includes a group of contiguous blocks of data on a storage device and the read request includes a file block number (FBN);

retrieve a first extent identifier from a first data structure, wherein the machine uses the FBN to traverse the first data structure to the first extent identifier; and retrieve a first reference to the first extent from a second data structure, wherein the machine uses the first extent identifier to traverse the second data structure to the first reference, and wherein the second data structure is global across a plurality of volumes;

retrieve, from the storage device, the extent using the first reference; and return the extent to the client.

14. The non-transitory machine readable medium of claim 13, wherein the first reference identifies a physical volume block number (PVBN).

15. The non-transitory machine readable medium of claim 14, wherein each PVBN is referenced directly by no more than one extent identifier.

16. The non-transitory machine readable medium of claim 13, wherein the first reference identifies a second extent identifier and the second extent identifier includes a second reference that identifies a PVBN.

17. The non-transitory machine readable medium of claim 13, wherein the machine uses the first extent identifier to traverse the second data structure to multiple references including the first reference, wherein the machine uses the multiple references to retrieve the extent.

18. The non-transitory machine readable medium of claim 13, wherein extents vary in length.

19. The non-transitory machine readable medium of claim 13, wherein the machine executable code includes instructions to:

determine if the FBN matches a stored FBN in the first data structure;

in response to a determination that the FBN does not match the stored FBN, determine an offset based on the FBN and the stored FBN; and use the offset to determine one or more data blocks to retrieve from the extent.

20. The non-transitory machine readable medium of claim 19, wherein the machine executable code includes instructions to determine the extent based on an overlap of one or more blocks determined by the FBN and a number of requested blocks in the read request with the group of contiguous blocks of data of the extent.

* * * * *